US006883168B1

(12) United States Patent
James et al.

(10) Patent No.: US 6,883,168 B1
(45) Date of Patent: Apr. 19, 2005

(54) METHODS, SYSTEMS, ARCHITECTURES AND DATA STRUCTURES FOR DELIVERING SOFTWARE VIA A NETWORK

(75) Inventors: Sarita M. James, Bellevue, WA (US); Brian J. Syme, Redmond, WA (US); Suryanarayanan V. Raman, Redmond, WA (US); Lawrence M. Sanchez, Redmond, WA (US); John A. Licata, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 790 days.

(21) Appl. No.: 09/599,299

(22) Filed: Jun. 21, 2000

(51) Int. Cl.[7] .............................................. G06F 9/445

(52) U.S. Cl. ..................................................... 717/178

(58) Field of Search ................................. 717/168–178

(56) References Cited

U.S. PATENT DOCUMENTS

| | | | | |
|---|---|---|---|---|
| 4,514,800 A | | 4/1985 | Gruner et al. | |
| 4,641,274 A | * | 2/1987 | Swank | 715/531 |
| 4,674,040 A | | 6/1987 | Barker et al. | |
| 4,739,477 A | | 4/1988 | Barker et al. | |
| 4,815,029 A | | 3/1989 | Barker et al. | |
| 4,910,663 A | * | 3/1990 | Bailey | 714/34 |
| 4,933,880 A | | 6/1990 | Borgendale et al. | |
| 4,962,475 A | | 10/1990 | Hernandez et al. | |
| 5,072,412 A | | 12/1991 | Henderson, Jr. et al. | |
| 5,187,786 A | | 2/1993 | Densmore et al. | |
| 5,191,645 A | | 3/1993 | Carlucci et al. | |
| 5,195,183 A | * | 3/1993 | Miller et al. | 709/231 |
| 5,204,947 A | | 4/1993 | Bernstein et al. | |
| 5,206,951 A | | 4/1993 | Khoyi et al. | |

(Continued)

FOREIGN PATENT DOCUMENTS

| | | |
|---|---|---|
| EP | 0 841 615 A2 | 5/1998 |
| EP | 0961197 | 10/1998 |
| EP | 0 961 197 | 1/1999 |
| EP | 1 076 290 A2 | 2/2001 |
| JP | 3191429 | 8/1991 |
| WO | WO 99/24945 | 5/1999 |
| WO | WO 99/56207 | 11/1999 |
| WO | WO 01/44934 A1 | 6/2001 |

OTHER PUBLICATIONS

"Delphi 5 Developer's Guide", by Xavier Pacheco et al., Sams Publishing, 1999, Chapter 31, Section: Data Streaming, 6 pages.*

(Continued)

*Primary Examiner*—Wei Y. Zhen

(57) ABSTRACT

Methods and systems for network-based or Internet-based software delivery are described. In one embodiment, an application program or software platform resides on a client. The program or platform is configured so that it is extensible based on software extensions that are deliverable over a network such as the Internet. Various extensions can be developed by third party developers for incorporation into the program or platform. In the described embodiment, extension files that comprise a software extension are hosted on an Internet server. Additional files are also hosted on the Internet server and describe aspects of the software extension. These additional files include files that describe a logical attachment of the extension to the program or platform, as well as files that describe the location of the extension files. Extensions are incorporated on a client by navigating to a particular Internet site through which the extensions can be accessed. The files describing the extension files are downloaded on the client. These files tell the client where the particular extension is to be plugged in, as well as where to find the appropriate extension files and how to download them. The extension files are then downloaded and incorporated into the program or platform.

41 Claims, 16 Drawing Sheets

U.S. PATENT DOCUMENTS

| | | | | | |
|---|---|---|---|---|---|
| 5,237,680 | A | | 8/1993 | Adams et al. | |
| 5,249,275 | A | | 9/1993 | Srivastava | |
| 5,274,803 | A | | 12/1993 | Dubin et al. | |
| 5,297,249 | A | | 3/1994 | Bernstein et al. | |
| 5,297,283 | A | | 3/1994 | Kelly, Jr. et al. | |
| 5,313,631 | A | * | 5/1994 | Kao | 707/204 |
| 5,313,646 | A | | 5/1994 | Hendricks et al. | |
| 5,333,317 | A | | 7/1994 | Dann | |
| 5,339,423 | A | | 8/1994 | Beitel et al. | |
| 5,339,424 | A | | 8/1994 | Fushimi | |
| 5,341,478 | A | | 8/1994 | Travis, Jr. et al. | |
| 5,369,766 | A | | 11/1994 | Nakano et al. | |
| 5,369,778 | A | | 11/1994 | San Soucie et al. | |
| 5,377,323 | A | | 12/1994 | Vasudevan | |
| 5,381,547 | A | | 1/1995 | Flug et al. | |
| 5,390,325 | A | * | 2/1995 | Miller | 714/38 |
| 5,408,665 | A | | 4/1995 | Fitzgerald | |
| 5,410,688 | A | | 4/1995 | Williams et al. | |
| 5,434,975 | A | | 7/1995 | Allen | |
| 5,436,637 | A | | 7/1995 | Gayraud et al. | |
| 5,440,744 | A | | 8/1995 | Jacobson et al. | |
| 5,446,842 | A | | 8/1995 | Schaeffer et al. | |
| 5,459,865 | A | | 10/1995 | Heninger et al. | |
| 5,481,722 | A | | 1/1996 | Skinner | |
| 5,504,898 | A | | 4/1996 | Klein | |
| 5,517,655 | A | | 5/1996 | Collins et al. | |
| 5,535,389 | A | | 7/1996 | Elder et al. | |
| 5,542,070 | A | | 7/1996 | LeBlanc et al. | |
| 5,550,976 | A | | 8/1996 | Henderson et al. | |
| 5,551,035 | A | | 8/1996 | Arnold et al. | |
| 5,572,643 | A | | 11/1996 | Judson | |
| 5,572,648 | A | | 11/1996 | Bibayan | |
| 5,577,252 | A | | 11/1996 | Nelson et al. | |
| 5,581,686 | A | | 12/1996 | Koppolu et al. | |
| 5,581,760 | A | | 12/1996 | Atkinson et al. | |
| 5,602,996 | A | | 2/1997 | Powers, III et al. | |
| 5,608,720 | A | | 3/1997 | Biegel et al. | |
| 5,627,979 | A | | 5/1997 | Chang et al. | |
| 5,634,121 | A | | 5/1997 | Tracz et al. | |
| 5,640,544 | A | | 6/1997 | Onodera et al. | |
| 5,659,729 | A | | 8/1997 | Nielsen | |
| 5,664,178 | A | | 9/1997 | Sinofsky | |
| 5,682,536 | A | | 10/1997 | Atkinson et al. | |
| 5,689,703 | A | | 11/1997 | Atkinson et al. | |
| 5,706,501 | A | | 1/1998 | Horikiri et al. | |
| 5,721,824 | A | * | 2/1998 | Taylor | 709/203 |
| 5,740,439 | A | | 4/1998 | Atkinson et al. | |
| 5,742,504 | A | | 4/1998 | Meyer et al. | |
| 5,745,683 | A | | 4/1998 | Lee et al. | |
| 5,758,184 | A | | 5/1998 | Lucovsky et al. | |
| 5,758,358 | A | | 5/1998 | Ebbo | |
| 5,761,408 | A | * | 6/1998 | Kolawa et al. | 714/38 |
| 5,761,683 | A | | 6/1998 | Logan et al. | |
| 5,764,984 | A | | 6/1998 | Loucks | |
| 5,764,985 | A | | 6/1998 | Smale | |
| 5,778,372 | A | | 7/1998 | Cordell et al. | |
| 5,784,555 | A | | 7/1998 | Stone | |
| 5,798,757 | A | | 8/1998 | Smith | |
| 5,802,304 | A | | 9/1998 | Stone | |
| 5,815,830 | A | | 9/1998 | Anthony | |
| 5,826,265 | A | * | 10/1998 | Van Huben et al. | 707/8 |
| 5,835,777 | A | * | 11/1998 | Staelin | 717/175 |
| 5,838,906 | A | | 11/1998 | Doyle et al. | |
| 5,842,018 | A | | 11/1998 | Atkinson et al. | |
| 5,845,077 | A | | 12/1998 | Fawcett | |
| 5,845,090 | A | * | 12/1998 | Collins et al. | 709/221 |
| 5,854,630 | A | | 12/1998 | Nielsen | |
| 5,859,973 | A | * | 1/1999 | Carpenter et al. | 709/203 |
| 5,864,819 | A | | 1/1999 | De Armas et al. | |
| 5,907,704 | A | | 5/1999 | Gudmundson et al. | |
| 5,911,776 | A | | 6/1999 | Guck | |
| 5,915,112 | A | | 6/1999 | Boutcher | |
| 5,922,072 | A | | 7/1999 | Hutchinson et al. | |
| 5,940,075 | A | | 8/1999 | Mutschler, III et al. | |
| 5,950,010 | A | * | 9/1999 | Hesse et al. | 717/178 |
| 5,963,964 | A | | 10/1999 | Nielsen | |
| 5,987,480 | A | | 11/1999 | Donohue et al. | |
| 5,999,740 | A | * | 12/1999 | Rowley | 717/173 |
| 6,014,135 | A | | 1/2000 | Fernandes | |
| 6,016,520 | A | | 1/2000 | Facq et al. | |
| 6,026,379 | A | | 2/2000 | Haller et al. | |
| 6,026,416 | A | | 2/2000 | Kanerva et al. | |
| 6,031,989 | A | | 2/2000 | Cordell | |
| 6,044,205 | A | | 3/2000 | Reed et al. | |
| 6,052,710 | A | | 4/2000 | Saliba et al. | |
| 6,054,987 | A | | 4/2000 | Richardson | |
| 6,072,870 | A | | 6/2000 | Nguyen et al. | |
| 6,078,326 | A | | 6/2000 | Kilmer et al. | |
| 6,078,327 | A | | 6/2000 | Liman et al. | |
| 6,081,610 | A | | 6/2000 | Dwork et al. | |
| 6,084,585 | A | | 7/2000 | Kraft et al. | |
| 6,091,417 | A | | 7/2000 | Lefkowitz | |
| 6,094,657 | A | | 7/2000 | Hailpern et al. | |
| 6,098,081 | A | | 8/2000 | Heidorn et al. | |
| 6,108,637 | A | | 8/2000 | Blumenau | |
| 6,108,783 | A | | 8/2000 | Krawczyk et al. | |
| 6,151,624 | A | | 11/2000 | Teare et al. | |
| 6,163,772 | A | | 12/2000 | Kramer et al. | |
| 6,167,521 | A | | 12/2000 | Smith et al. | |
| 6,195,661 | B1 | | 2/2001 | Filepp et al. | |
| 6,199,204 | B1 | | 3/2001 | Donohue | |
| 6,209,128 | B1 | | 3/2001 | Gerard et al. | |
| 6,216,152 | B1 | | 4/2001 | Wong et al. | |
| 6,219,698 | B1 | * | 4/2001 | Iannucci et al. | 709/221 |
| 6,235,027 | B1 | | 5/2001 | Herzon | |
| 6,253,366 | B1 | | 6/2001 | Mutschler, III | |
| 6,253,374 | B1 | | 6/2001 | Dresevic et al. | |
| 6,263,313 | B1 | | 7/2001 | Milsted et al. | |
| 6,266,810 | B1 | | 7/2001 | Tanaka et al. | |
| 6,275,227 | B1 | | 8/2001 | DeStefano | |
| 6,275,599 | B1 | | 8/2001 | Adler et al. | |
| 6,282,711 | B1 | * | 8/2001 | Halpern et al. | 717/175 |
| 6,286,033 | B1 | | 9/2001 | Kishinsky et al. | |
| 6,292,897 | B1 | | 9/2001 | Gennaro et al. | |
| 6,297,819 | B1 | | 10/2001 | Furst | |
| 6,308,179 | B1 | | 10/2001 | Petersen et al. | |
| 6,311,271 | B1 | | 10/2001 | Gennaro et al. | |
| 6,321,334 | B1 | | 11/2001 | Jerger et al. | |
| 6,327,628 | B1 | | 12/2001 | Anuff et al. | |
| 6,345,256 | B1 | | 2/2002 | Milsted et al. | |
| 6,345,361 | B1 | | 2/2002 | Jerger et al. | |
| 6,347,323 | B1 | | 2/2002 | Garber et al. | |
| 6,349,408 | B1 | | 2/2002 | Smith | |
| 6,353,926 | B1 | | 3/2002 | Parthesarathy et al. | |
| 6,357,038 | B1 | | 3/2002 | Scouten | |
| 6,366,912 | B1 | | 4/2002 | Wallent et al. | |
| 6,369,840 | B1 | | 4/2002 | Barnett et al. | |
| 6,374,402 | B1 | | 4/2002 | Schmeidler et al. | |
| 6,381,742 | B1 | * | 4/2002 | Forbes et al. | 717/176 |
| 6,381,743 | B1 | | 4/2002 | Mutschler, III | |
| 6,393,456 | B1 | | 5/2002 | Ambler et al. | |
| 6,396,488 | B1 | | 5/2002 | Simmons et al. | |
| 6,408,311 | B1 | | 6/2002 | Baisley et al. | |
| 6,421,070 | B1 | | 7/2002 | Ramos et al. | |
| 6,421,656 | B1 | | 7/2002 | Cheng et al. | |
| 6,425,125 | B1 | | 7/2002 | Fries et al. | |
| 6,434,563 | B1 | | 8/2002 | Pasquali et al. | |
| 6,442,755 | B1 | | 8/2002 | Lemmons et al. | |
| 6,446,110 | B1 | | 9/2002 | Lection et al. | |
| 6,460,058 | B1 | | 10/2002 | Koppolu et al. | |
| 6,473,800 | B1 | | 10/2002 | Jerger et al. | |

| | | | | | |
|---|---|---|---|---|---|
| 6,476,833 | B1 | | 11/2002 | Moshfeghi | |
| 6,493,702 | B1 | | 12/2002 | Adar et al. | |
| 6,502,103 | B1 | | 12/2002 | Frey et al. | |
| 6,505,230 | B1 | | 1/2003 | Mohan et al. | |
| 6,505,300 | B1 | | 1/2003 | Chan et al. | |
| 6,507,856 | B1 | | 1/2003 | Chen et al. | |
| 6,516,322 | B1 | | 2/2003 | Meredith | |
| 6,519,617 | B1 | | 2/2003 | Wanderski et al. | |
| RE38,070 | E | | 4/2003 | Spies et al. | |
| 6,546,546 | B1 | | 4/2003 | Van Doorn | |
| 6,549,221 | B1 | | 4/2003 | Brown et al. | |
| 6,560,640 | B1 | | 5/2003 | Smethers | |
| 6,571,253 | B1 | | 5/2003 | Thompson et al. | |
| 6,578,144 | B1 | | 6/2003 | Gennaro et al. | |
| 6,584,548 | B1 | | 6/2003 | Bourne et al. | |
| 6,585,778 | B1 | | 7/2003 | Hind et al. | |
| 6,604,099 | B1 | | 8/2003 | Chung et al. | |
| 6,606,606 | B1 | | 8/2003 | Starr | |
| 6,609,200 | B1 | | 8/2003 | Anderson et al. | |
| 6,611,822 | B1 | | 8/2003 | Beams et al. | |
| 6,611,840 | B1 | | 8/2003 | Baer et al. | |
| 6,613,098 | B1 | | 9/2003 | Sorge et al. | |
| 6,615,276 | B1 | * | 9/2003 | Mastrianni et al. | 709/250 |
| 6,631,357 | B1 | | 10/2003 | Perkowski | |
| 6,643,684 | B1 | | 11/2003 | Malkin et al. | |
| 6,668,369 | B1 | | 12/2003 | Krebs et al. | |
| 6,678,717 | B1 | | 1/2004 | Schneider | |
| 6,691,230 | B1 | | 2/2004 | Bardon | |
| 6,697,944 | B1 | | 2/2004 | Jones et al. | |
| 6,701,434 | B1 | | 3/2004 | Rohatgi | |
| 6,711,679 | B1 | | 3/2004 | Guski et al. | |
| 2001/0056429 | A1 | | 12/2001 | Moore et al. | |
| 2002/0026461 | A1 | | 2/2002 | Kutay et al. | |
| 2002/0057297 | A1 | | 5/2002 | Grimes et al. | |
| 2002/0174147 | A1 | | 11/2002 | Wang et al. | |
| 2003/0120659 | A1 | | 6/2003 | Sridhar | |
| 2003/0158897 | A1 | | 8/2003 | Ben-Natan et al. | |

OTHER PUBLICATIONS

"The Component Object Model: A Techinal Overview" by Sara Williams et al., Microsoft Corporation, Oct. 1994.*

Clark, James, Ed.; "XSL Transformation (XSLT) Version 1.0", Nov. 16, 1999, W3C (MIT, INRIA, Keio), pp. 1–156.

Clark, James and Steve Derose, "XML Path Language (XPath) Version 1.0", Nov. 16, 1999, W3C (MIT, INRIA, Keio), pp. 1–49.

Musgrave, S., "Networking technology—impact and opportunities", Survey and Statistical Computing 1996. Proceedings of the Second ASC International Conference. Sep. 1996, pp. 369–378, London, UK.

Rapaport, L., "Get more from SharePoint", Transform Magazine, vol. 11, No. 3, Mar. 2002, pp. 13, 15.

McCright, J.S., "New Tool Kit to Link Groove with Microsoft SharePoint", eWeek, Enterprise News & Reviews, Ziff Davis Media Inc., Jul. 29, 2002, 1 page.

U.S. Appl. No. 60/209,713, filed Jun. 05, 2000.

U.S. Appl. No. 60/191,662, Moore et al., filed Mar. 23, 2000.

U.S. Appl. No. 60/203,081, Ben–Natan et al., filed May 09, 2000.

Noore A.; "A secure conditional access system using digital signature and encryption" 2003 Digest of Technical Papers. International Conference on Consumer Electronics Jun. 2003 pp. 220–221.

Komatsu N. et al.; "A proposal on digital watermark in document image communication and its application to realizing a signature" Electronics and Communications in Japan.

Sun Q. et al.; "A robust and secure media signature scheme for JPEG images" Proceedings of 2002 IEEE Workshop on Multimedia Signal Processing Dec. 2002 pp. 296–299.

Whitehill; "Whitehill Composer" Whitehill Technologies Inc. 2 pages.

Hwang, Kai et al., "Micro–Firewalls for Dynamic Network Security with Distributed Intrustion Detection," IEEE Int'l. Symposium on Network Computing and Applications, 2001 pp. 68–79.

Clarke; "From small beginnings" Knowledge Management, Nov. 2001; www.bl.uk; 2 pages.

Schmid, M. et al., "Protecting Data from Malicious Software," 18th Annual Security Applications Conference, 2002, pp. 199–208.

Kaiya, Haruhiko et al., "Specifying Runtime Environments and Functionalities of Downloadable Components under the Sandbox Model," Int'l Symposium on Principles of Software Evolution, 2000, pp. 138–142.

Tomimori, Hiroyuki et al., "An Efficient and Flexible Access Control Framework for Jav aPrograms in Mobile Terminals," Proceedings of 22nd Int'l. Conference on Distributed Computing Systems Workshops, 2002, pp. 777–782.

Prevelakis, Vassilis et al., "Sandboxing Applications," Freenix Track: 2001 Usenix Annual Technical Conference, pp. 119–126.

W. Brogden, "Arbortext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.

L Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

A. Davidow, "XML Editors: Allegations of Functionally in search of reality," INTERNET, 'Online! 1999 , XP002230082, retrieved from the Internet, <URL:http://www.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineeering, vol. 11, No. 4, Jul./Aug. 1999, pp. 629–638.

Hirotaka Kanemoto, et al., "An Efficiently Updatable Index Scheme for Structured Documents", 1998 IEEE, pp. 991–996.

Tommie Usdin, et al., "XML: Not a Silver Bullet, But a Great Pipe Wrench", Standardview vol. 6, No. 3, Sep. 1998, pp. 125–132.

Supoj Sutanthavibul, et al., "XFIG Version 3.2 Patchlevel 2(Jul 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 18, 2003].

"Architecture for a Dynamic Information Area Control", IBM Technical Disclosure Bulletin, IBM Corp. New York, US, vol. 37, No. 10, Jan. 10, 1994, pp. 245–246.

Irene Au & Shuang Li, "Netscape Communicator's Collapsible Toolbars," CHI '98, Human Factors in Computing Systems, Conference Proceedings, Los Angeles, CA, Apr. 18–23, 1998, pp. 81–86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.
"Netscape window" Netscape Screenshot, Oct. 2, 2002.
Jan–Henrick Haukeland: "Tsbiff—tildeslash biff—version 1.2.1" Internet Document, [Online] Jun. 1999, URL:http://web.archive.org/web/19990912001527/http://www.tildeslash.com/tsbiff/.
Richard Scott Hall, "Agent–based Software Configuration and Deployment," Thesis of University of Colorado, Online, Dec. 31, 1999, retrieved from the Internet on Nov. 07, 2003: <http://www.cs.colorado.edu/users/rickhall/documents/ThesisFinal.pdf>, 169 pages.
Arthur Van Hoff et al., "The Open Software Description Format," Online, Aug. 13, 1997, retrieved from the Internet on Nov. 7, 2003: <http://www.w3.org/TR/Note–OSD>, 11 pages.
Netscape Communications Corp., "SmartUpdate Developer'Guide," Online, Mar. 11, 1999, retrieved from the Internet on Dec. 08, 2000: <http://developer.netscape.com:80/docs/manuals/communicator/jarman/index.htm>, 83 pages.
Linnea Dayton and Jack Davis, "Photo Shop 5/5.5 WOW! Book," 2000, Peachpit Press, pp. 8–17.
Varlamis et al., "Bridging XML–Schema and relational databases. A system for generating and manipulating relational databases using valid XML documents," DocEng '01, Nov. 9–10, 2001, Copyright 2001, ACM 1–58113–432–0/01/0011, pp. 105–114.
Hardy et al., "Mapping and Displaying Structural Transformations between XML and PDF," DocEng '02, Nov. 8–9, 2002, Copyright 2002, ACM 1–58113–594–7/02/0011, pp. 95–102.
Kim et al., "Immediate and Partial Validation Mechanism for the Conflict Resolution of Update Operations in XML Databases," WAIM 2002, LNCS 2419, 2002, pp. 387–396, Springer–Verlag Berlin Heidelberg 2002.

Chuang, T., "Generic Validation of Structural Content with Parametric Modules," ICFP '01, Sep. 3–5, 2001, Copyright 2001, ACM 1–58113–415–0/01/0009, pp. 98–109.

Chen et al., "Designing Valid XML Views," ER 2002, LNCS 2503, 2002, Springer–Verlag Berlin Heidelberg 2002, pp. 463–477.

Chen et al., "XKvalidator: A Constraint Validator for XML," CIKM '02, Nov. 4–9, 2002, Copyright 2002, ACM 1–58113–492–4/02–0011, pp. 446–452.

Rogge et al., "Validating MPEG–21 Encapsulated Functional Metadata," IEEE 2002, pp. 209–212.

Nelson, "Validation with MSXML and XML Schema," Windows Developer Magazine, Jan. 2002. pp. 35–38.

Chien et al., "XML Document Versioning," SIGMOD Record, vol. 30, No. 3, Sep. 2001, pp. 46–53.

Wong et al., "Managing and Querying Multi–Version XML Data with Update Logging," DocEng '02, Nov. 8–9, 2002, Copyright 2002, ACM 1–58113–594–7/02/0011, pp. 74–81.

Chien et al., "Efficient schemes for managing multiversion-XML documents", VLDB Journal (2002), pp. 332–353.

Chien et al., "Efficient Management of Multiversion Documents by Object Referencing," Proceedings of the 27th VLDB Conference, 2001, pp. 291–300.

Chien et al., "Storing and Querying Multiversion XML Documents using Durable Node Numbers," IEEE 2002, pp. 232–241.

Dyck, T., "XML Spy Tops and XML Editor," http://www.eweek.com/article2/0,3959,724041,00.asp, Nov. 25, 2002, 4 pages.

* cited by examiner

130
System Memory
134
(ROM) 138
BIOS 142
(RAM) 140
Operating System 158
Application Programs 160
Other Program Modules 162
Program Data 164
Processing Unit
132
136
Bus
Video Adapter
174
172
SCSI Interface
154
144
146
148
150
152
Keyboard/ Mouse Interface
170
168
166
Keyboard
Serial Port
156
Modem
186
Network Interface
184
Local Area Network
180
Wide Area Network
182
176
178
Application Programs
160
Operating System
158
Application Programs
160
Other Modules
162
Program Data
164

Extension Tag

```
<EDF:Extension
xmlns:EDF = "urn:schemas-microsoft-com:netdocs_edf.v1"
URN = "urn:HelloNetDocs.netdocs.com"
Name = "HelloNetDocs"
Version = "1.0.0.0"
LastUpdate = "2000-01-15  8:43:52"
Description = "Hello NetDocs"

>
        (...)
</EDF:Extension>
```

*Fig. 4*

EDF Schema

```
<?xml...>
<! --info about the extensions and linked extensions -- >
<edf:extension ...>

        <edf:edfLink ... />

<! --UI extensions -- >
        <edf:toolbars> ... </edf:toolbars>
        <edf:accelerators> ... </edf:accelerators>
        <edf:menuItems> ... </edf:menuItems>
        <edf:commandGroups> ... </edf:commandGroups>
        <edf:themes> ... </edf:themes>

<! -- Objects, Components and Behavior Extensions -- >
        <edf:Services> ... </edf:Services>

<! -- LocalStore Extensions -- >
        <edf:contentClasses> ... </edf:contentClasses>
        <edf:subscriptions> ... </edf:subscriptions>


</edf:extension>
```

Package Manifest

```
<?xml version "1.0" ?>
<Package Size= "..." >
        <Files>
                <Group Name = "required".
                        <File Name="bar.dll" />
                        <File Name="foo.dll" Hash="..."/>
                                <Dependencies>
                                        <File Name="bar.dll" />
                                </Dependencies>
                                <COMClass ClassID="..." />
                        </File>
                        <File Name="myextension.edf" Hash="..."/>
                        <File Name="errorhandling.gif" Hash="..."/>
                </Group>
                <Group Name = "offline">
                        <File Name="bar.xml" Hash="..."/>
                        <File Name="abc.gif" Hash="..."/>
                        <File Name="xyz.gif" Hash="..."/>
                        <File Name="foo.htm" Hash="..."/>

                </Group>
                <Group Name = "ondemand">
                        <File Name="foo2.htm" Hash="..."/>
                </Group>
        </Files>
</Package>
```

Fig. 6

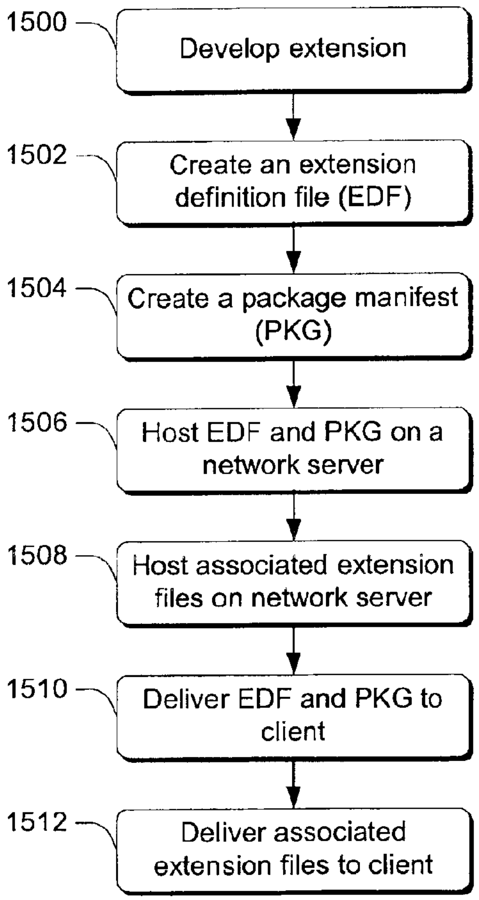

Fig. 15

```
<cat:extensionCatalog  xmlns:cat="urn:schemas-microsoft-
com:netdocs_edfcatalog.v1"
        lastUpdate="2000-01-15  8:43:52"
        description = "Catalog of extensions from hosted service"
>
<cat:extension  extensionURN="urn:planner.netdocs.com"
        name="Planner"
        packageURN ="urn:planner.netdocs.com.ENv1"
        url="http://netdocs/extensions/planner/v1/EN/sc.cab"
        language="English"
        version="1"
        defaultLanguage="yes"
/>
<cat:extension  extensionURN="urn:planner.netdocs.com"
        name="Planner"
        packageURN ="urn:planner.netdocs.com.FRv1"
        url="http://netdocs/extensions/planner/v1/FR/sc.cab"
        language="French"
        defaultversion="yes"
        version="1"
/>
<cat:extension  extensionURN="urn:planner.netdocs.com"
        name="Planner"
        packageURN ="urn:planner.netdocs.com.ENv1.1"
        url="http://netdocs/extensions/planner//v1.1/EN/sc.cab"
        language="English"
        version="1.1"
        defaultLanguage="yes"
        defaultversion="yes"
/>
</cat:extensionCatalog>
```

Fig. 16

METHODS, SYSTEMS, ARCHITECTURES AND DATA STRUCTURES FOR DELIVERING SOFTWARE VIA A NETWORK

RELATED APPLICATIONS

The following patent applications are related to the present application, are assigned to the assignee of this patent application, and are expressly incorporated by reference herein:

U.S. patent application Ser. No. 09/599,298, entitled "Single Window Navigation Methods and Systems", and filed on the same date as this patent application;

U.S. patent application Ser. No. 09/599,806, entitled "Methods and Systems of Providing Information to Computer Users", and filed on the same date as this patent application;

U.S. patent application Ser. No. 09/599,048, entitled "Network-based Software Extensions", and filed on the same date as this patent application;

U.S. patent application Ser. No. 09/599,813, entitled "Authoring Arbitrary XML Documents Using DHTML and XSLT", and filed on the same date as this patent application;

U.S. patent application Ser. No. 09/599,812, entitled "Architectures For And Methods Of Providing Network-based Software Extensions", and filed on the same date as this patent application;

U.S. patent application Ser. No. 09/599,086, entitled "Task Sensitive Methods And Systems For Displaying Command Sets", and filed on the same date as this patent application.

TECHNICAL FIELD

This invention relates to methods and systems for providing software via a network. More specifically, the invention pertains to Internet-based delivery of software.

BACKGROUND

Installation of traditional PC applications requires physical media, such as a disk or CD-ROM that must be physically inserted into a computer in order for software to be loaded onto a user's computer. Typically, this process requires the user to enter settings information that can be confusing to the user. Once the software is installed, it is typically fixed in terms of its location and functionality. When the software is updated, the user must typically purchase additional physical media and repeat the installation process so that they can use the updated software. In this model, the software is fixed in its association with the computer on which it was installed. If a user moves to another computer, they will not be able to use the specific software on their machine.

As computing continues to evolve in the environment of the Internet, it has become clear that the traditional software delivery model described above is inadequate to meet the demands of consumers who desire dynamic, flexible, and adaptable software. Software delivery over the Web is becoming the subject of increasing focus by those who develop and deliver software. Unlocking the potential for Web-based software delivery will require smart, innovative and streamlined solutions, especially in situations where bandwidth may be limited.

Accordingly, this invention arose out of concerns associated with providing new software delivery models that are particularly well-suited for network-based software delivery, e.g. delivery via the Internet.

SUMMARY

Methods and systems for network-based software delivery are described. In one embodiment, an application program or software platform resides on a client. The program or platform is configured so that it is extensible based on software extensions that are deliverable over a network such as the Internet. Various extensions can be developed by third party developers for incorporation into the program or platform.

In one described embodiment, extension files that comprise a software extension are hosted on a network server such as an Internet server. These include descriptor files that describe aspects of the software extension. These descriptor files logically describe an extension to the program or platform and designate the location of other extension files. Extensions are incorporated on a client by navigating to a particular network or Internet site through which the extensions can be accessed. The files describing the extension files are downloaded on the client. These files tell the client where, when and how the particular extension can be plugged into the program or platform, as well as where to find the appropriate extension files and how to download them. The extension files are then downloaded and incorporated into the platform.

In one embodiment, an inventive software architecture is provided for handling and consolidating particular types of descriptive files associated with various extensions. A filtering mechanism called attachment points, is used to create handlers for the different descriptive types of files that define a software extension. Each of these handlers is known as an attachment manager. Attachment managers are provided for each extensible feature type. The attachment managers interpret data from extensions files which are supplied by attachment points. In addition to predefined attachment managers, custom attachment managers can be created using data from attachment points. When an extension extends a particular feature type, the attachment points ensure that only the appropriate attachment manager is notified so that the feature type can be incorporated into the program or platform efficiently.

BRIEF DESCRIPTION OF THE DRAWINGS

FIG. 4 shows a portion of an EDF schema in accordance with the described embodiment.

FIG. 5 shows a portion of an EDF schema in accordance with the described embodiment.

FIG. 6 shows a portion of a PKG in accordance with the described embodiment.

FIG. 15 is a flow diagram of steps in a method in accordance with the described embodiment.

FIG. 16 shows a portion of an exemplary catalog structure in accordance with the described embodiment.

DETAILED DESCRIPTION

Overview

The methods and systems described just below provide a mechanism by which software can be delivered over a network, such as the Internet. In one specific example, various functionalities can be added dynamically to an application program. The functionalities or "extensions" as they will be referred to, can be advantageously added via a network such as the Internet. Extensions, which can be associated with various levels of granularity, can be added using only a Web URL as a basis for extension installation. That is, all of the files that comprise an extension can be maintained on the Web and accessed via one or more Web sites.

Extensions can be described utilizing a hierarchical tag-based language which facilitates handling and use of the various extensions. In one particular implementation, a software platform is provided that can incorporate various functionalities. The software platform and the inventive architecture described below enable third and fourth party developers to develop extensions for the platform that can be easily and seamlessly incorporated into the platform, while relieving the developers of any requirements associated with knowledge about how the extensions will be incorporated into the platform. Thus, the incorporation of third party extensions is essentially a transparent process, as far as developers are concerned.

Figure 1:
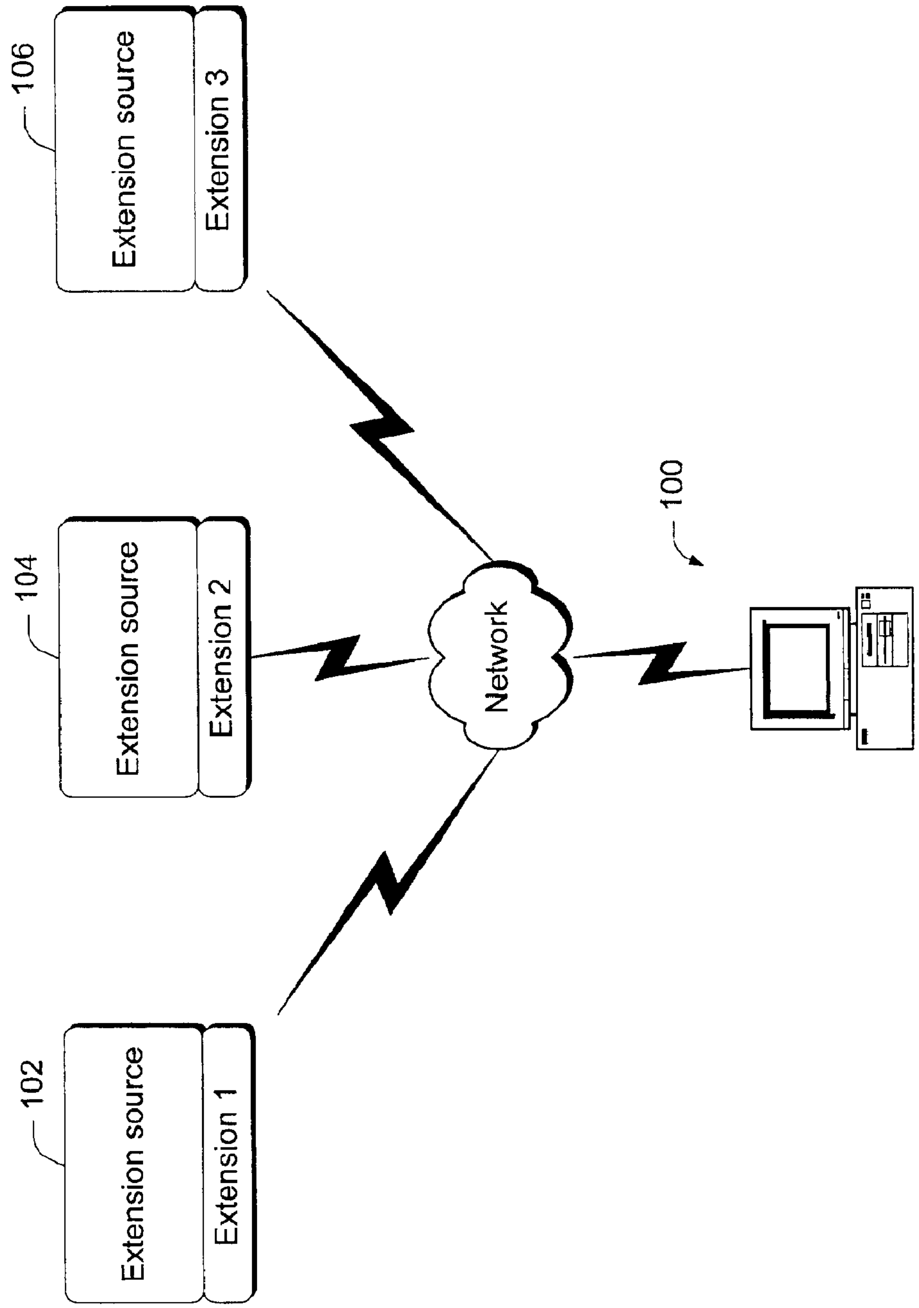
FIG. 1 is a high level view of a system that can be utilized in accordance with one described embodiment.

Consider for example, FIG. 1 which shows a user's computer 100 and several so-called extension sources 102, 104, and 106. The extension sources can comprise any entity from which a software extension can be obtained via a network. In an exemplary implementation, the network can comprise the Internet, although other networks (e.g. LANs and WANs) can certainly be utilized. Extension sources can include, without limitation, business entities such as retail stores that might maintain a network site. In one implementation, a user can execute software on their computer that provides an application program or software platform. In this document, the terms "application program" and "software platform" will be used interchangeably. Each of the different extension sources 102–106 can provide software extensions that can plug into the software platform that is executing on the user's machine. These extensions are deliverable via a network such as the Internet, and assist in providing applications that can be executed on the user's machine. In the described embodiment, the extensions are logically described in XML which is in line with emerging industry standards. Additionally, the use of XML assists in the future discoverability of extensions by promoting XML DOM properties on the Internet. It will be appreciated, however, that any suitable format can be used for describing the extensions, e.g. a binary description could be used.

Extensions can be delivered from any number of different extension sources. The inventive methods and systems provide a streamlined and organized way to handle the provided extensions. The use of XML advantageously enables efficient handling of extensions from multiple different extension sources, without unduly taxing the software components that utilize specific portions of an extension or extensions.

In one particular implementation, the software platform on the user's machine provides various different integrated functionalities that enable a user to accomplish different document-centric tasks. An exemplary system is described in the U.S. Patent Application entitled "Single Window Navigation Methods and Systems", incorporated by reference above.

Exemplary Computer Environment

Figure 2:
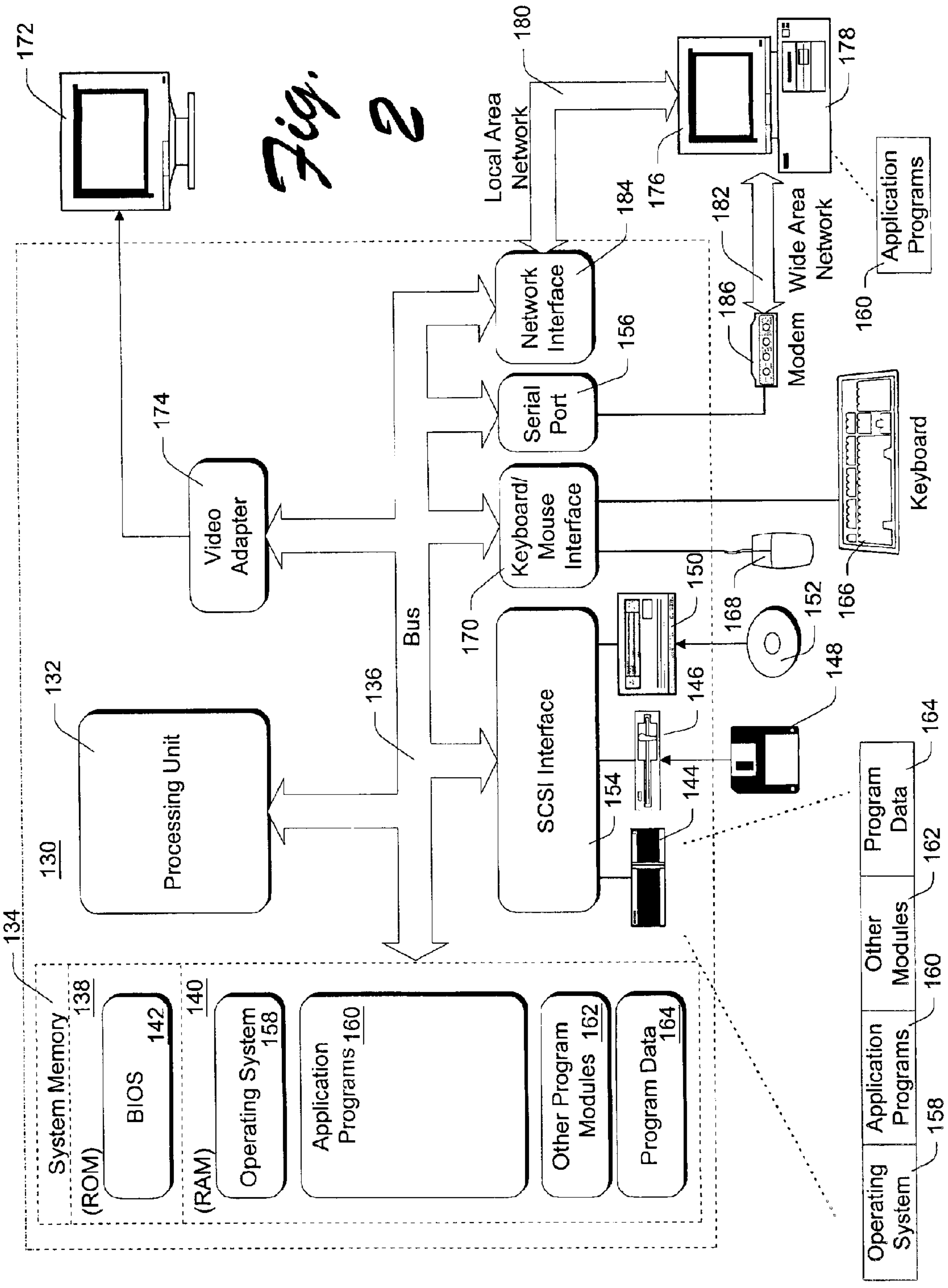
FIG. 2 is an exemplary computer system that can be utilized in accordance with the described embodiment.

FIG. 2 shows an exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Extensions

An "extension", as used in this document, will be considered to include, without limitation, software functionality and content that can be added to an application program or software platform. These additions typically provide some type of functionality that the application program may not have had before the extension was incorporated, or alter the behavior of at least one existing feature. The extension is incorporated or integrated directly into the application program in a way that changes, to some degree, the manner in which the application program behaves or operates. Extensions provide dynamically added content and can provide applications (such as an email application), plug-ins to extend existing applications (like a fax plug-in to an email application), or simply web pages, to name just a few.

In the described embodiment, extensions are described using XML, an industry-standard, text-based markup language. XML greatly facilitates the extensibility of software content. Specifically, various extensions can be authored by third parties and described in XML in a manner that enables the extensions to be readily integrated into application programs. It should be appreciated, however, the XML constitutes but one exemplary way of describing and using the extensions. Other ways can, of course, be used.

Exemplary Extension Organization

In the described embodiment, extensions are organized in three separate but related portions: an Extension Definition File (EDF), a Package Manifest (PKG), and the code, components, or "bits" that make up or define the extension. An EDF can be, but need not be associated with a URL (Universal Resource Locator) that provides a way for a client to access the EDF. By convention and choice, the PKG file is located at the same URL as the EDF. It will be appreciated that the described EDFs and PKG are each not required for the other to be used. It just so happens that, in the example that is given is this document, the two are employed together. To that end, each of these features can be separately and independently employed.

EDFs describe logical attachments to an application program or software platform, while PKGs specify the physical files and resources that are used in an extension. There can be a one to one correspondence between EDFs and PKGs.

Figure 3:
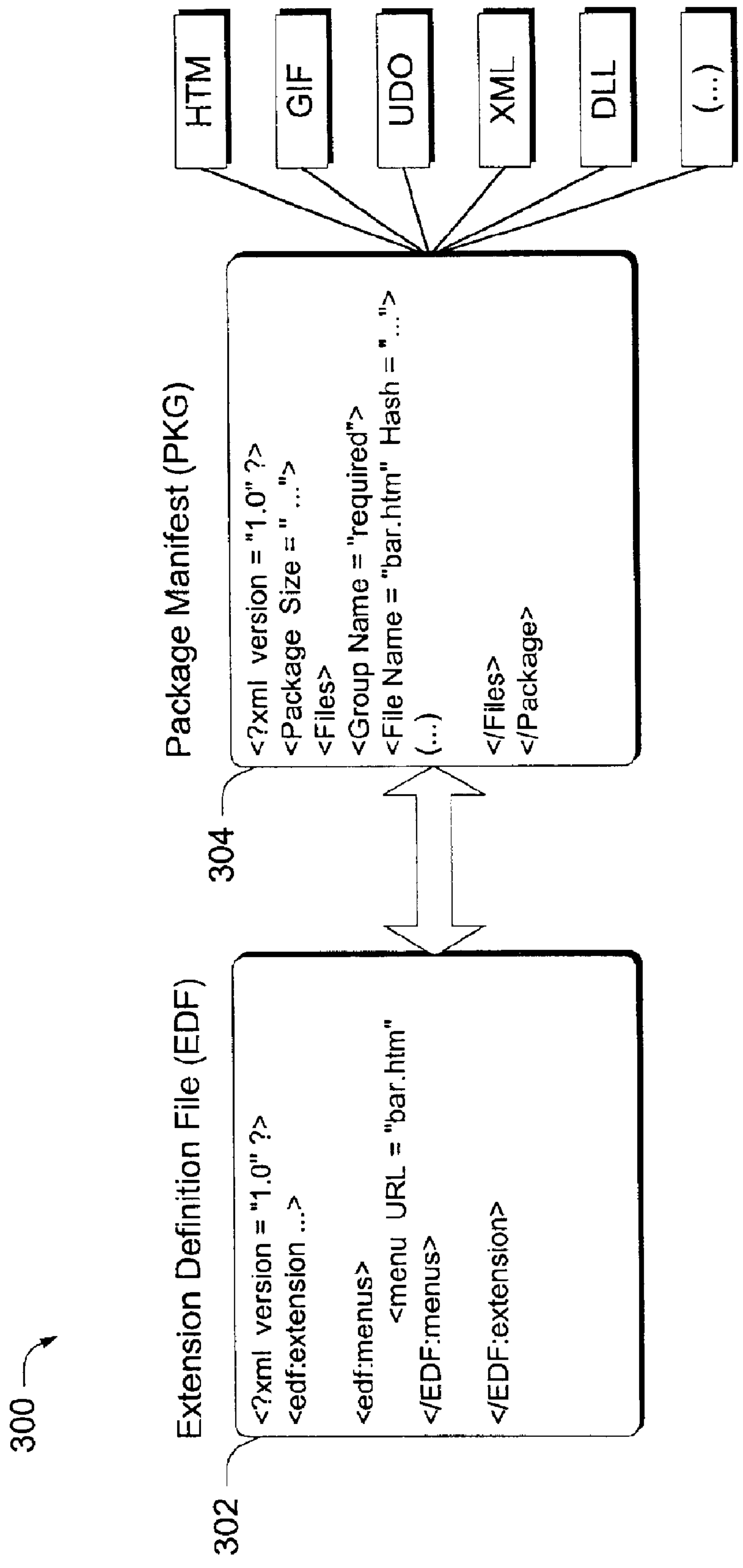
FIG. 3 is a diagram of an exemplary Extension Definition File (EDF) and package manifest (PKG) in accordance with one described embodiment.

FIG. 3 shows an exemplary organization 300 that includes an EDF 302 and a corresponding package manifest (PKG) 304. In the illustrated example, the EDF 302 uses XML, a hierarchical tag-based language, to describe the logical attachments or extensions to an application program. The corresponding PKG 304 also specifies the physical files and resources that are associated with a particular extension in XML. Exemplary file types are shown to the right of PKG 304 and include, without limitation, HTM, GIF, UDO, XML, DLL, and various other types of files.

Extension Definition File (EDF)

In the described example, an EDF is an XML file that logically describes an extension. For example, the EDF can describe HTML that makes up a user interface (UI), the objects that contain code for implementing various functions, and the like. The EDF can also contain all or part of the functionality that comprises an extension. For instance, the HTML that describes a toolbar could be incorporated directly into an EDF file, and a toolbar attachment manager could read it from the EDF file, instead of from a URL. The information contained in the EDF is processed and (together with the information contained in the PKG), the appropriate files are automatically installed on a user's computer. This is done unobtrusively without manipulating the computer's persisted settings, as might be found in the user's system registry.

An EDF, implemented in XML, contains various tags that are associated with various extensions. The various tags can correspond to:

User interface elements

Behaviors/Components/Objects

Store Elements

User-defined objects

Or anything else that represents a point of extensibility in the application or platform EDFs advantageously have an "open schema" which means that third party developers can extend the extension mechanism and include their own extensions by creating their own tags. Additionally, extensions can themselves be extended by other developers. EDFs can also have one or more predefined tags. Exemplary predefined XML tags for user interface elements can include tags for feature types such as: tool bars, accelerators, menu items, and themes. These feature types are utilized in the single navigable window application incorporated by reference above and defined in the table immediately below:

TABLE 1

| Feature Type | Definition |
|---|---|
| Tool Bars | Horizontal command containers above the document area. |
| Accelerators | Keyboard shortcuts for commands |
| Menu Items | Pop-up or pop-down menu choices that third parties can add to well-known, named menu attachments in the platform |
| Themes | A data-driven way to provide overrides for well-known resources of the platform, such as default buttons or default style sheet |

Exemplary predefined XML tags for behaviors/components/objects include tags for Services. These feature types are utilized in the single navigable window application incorporated by reference above and defined in the table immediately below:

TABLE 2

| Feature Type | Definition |
|---|---|
| Services | Services are objects that extend existing objects (such as the application, window, or document) in the application or platform's Object Model. For example, editing functions use Object Model Attachments attached to the window or document that maintain document context and editing state per-window. These can also include Object Model Attachments attached to the application (such as a spellchecker dictionary object) |

Exemplary predefined XML tags for store elements include tags for content classes and offline data sources. These feature types are utilized in the single navigable window application incorporated by reference above and defined in the table immediately below:

TABLE 3

| Feature Type | Definition |
|---|---|
| Content Classes | Allow extension writers to define new types of XML documents with new schemas. |
| Offline Data Sources | Allow for extension writers to define store replication instructions in an EDF. |

EDF Schema

In the described embodiment, the EDFs have a particular XML schema that is utilized. The schema comprises collections of XML tags that are arranged in a hierarchical organization to facilitate information dissemination to software components that need certain extensions. In the described embodiment, the outer (encompassing tag) for EDFs is an "extension" tag.

FIG. 4 shows an exemplary extension tag. "extension" tags can include one or more of the following attributes, all of which are optional:

TABLE 4

| Attribute | Definition |
|---|---|
| urn | ID for the extension. It allows extension writers to specify relative locations for content in EDFs without using relative paths or fixed URLs. It also allows hosting administrators to move around extensions on servers without breaking any links. |
| name | Name that can be used in a status bar or message display |
| version | Vendor-determined version number for the extension. |
| lastUpdate | Date/time that the EDF was last modified. |
| description | Brief description of the extension. |

Within the "extension" outer tag are one or more child tags, also referred to as "top level tags". These top level tags are each associated with a feature type that can be added by a particular extension. Exemplary feature types are discussed in connection with Tables 1–3 above. Underneath each top level tag there can be one or more child tags that are individually associated with a particular feature of the feature type that is to be added by a particular extension.

FIG. 5 shows an exemplary XML schema organization in accordance with this embodiment. For each top level tag in an EDF, there is an associated attachment manager which is a software component that receives data associated with the tag so that the data can be used to incorporate the extension into the platform or application program. Different attachment managers may interpret the data from the tag in different ways to provide different types of extensibility, so different top level tags will contain different types of data in different structures. This will become more evident in the "Architecture" section below. Note that the "edf:" XML namespace qualifier enables support of an open schema where extensions can provide their own tags and corresponding attachment managers. Tags within the edf namespace are used by built-in attachment managers in the application or software platform. Tags in other namespaces are used by third-parties to provide additional points of extensibility.

Package Manifest (PKG File)

The package manifests (PKGs) assist in organizing the downloading of software in the form of multiple files over a network such as the Internet. The PKGs are advantageously employed, in the example given in this document, with EDFs. As pointed out above, however, the techniques discussed in connection with the PKGs can be deployed independently of EDFs and in any suitable scenario where it is desirable to deliver software over a network such as the Internet. While the EDFs describe the logical attachment of extensions into an application program or platform, the package manifest's role is to assist in one or more of: organized delivery, validation and/or, updating of files associated with the various extensions that can be provided.

In designing a delivery mechanism for Web-assisted delivery of software content or files, several considerations are of interest.

Whenever possible, it is desirable to reduce the size of required downloads during update and installation operations. To address this consideration, software content is broken into multiple packages. Each package contains a group of one or more files that implement a common or well-defined functionality. By breaking the content into individual packages, the size of the required download during installation and update can be minimized. Each package is then described by a package manifest (PKG) that includes file information such as file locations and hash values that can be used for validation or security and versioning.

It is also desirable to give the end user a Web-like experience. To do this, extensions are loaded in a manner that feels to a user more like they are loading a web page, rather than traditional software packages where the user has to wait until the entire package is loaded before they can interact with it. In the described embodiment, users are given a web-like experience by streaming the extension files down to the client so that a user can begin to interact with an application program much sooner than if they had to wait for the entire software application program to load. For example, if there are user interface (UI) image files streaming down, the user can see the UI as the files stream in. Consider, for example, the single application program having the multiple different functionalities that is described in the patent application incorporated by reference above. A user might browse to an email functionality and download the files that are necessary to interact with the email functionality. Files that are associated with another different functionality would then be downloaded after the files associated with the email functionality. In this way, the user can begin to operate within a particular functionality without having to wait for all of the files associated with all of the other functionalities.

Another consideration of interest pertains to the efficiency with which the extension files or "bits" are delivered to the client. To address this consideration, the described embodiment utilizes a couple of different download approaches: a throttled download and a background download. Throttled downloading conducts download operations while taking into account the available bandwidth and type of media over which the files are being transferred. Any suitable throttled download process can be employed and will be understood by those of skill in the art. Background download is conducted while the user is working within the application program and is implemented by allocating a background thread so that the user can continue their work. One optimization that is utilized is that packages are prioritized and delivered in accordance with what a user might be working on.

Another consideration is associated with optimizing the user's computing experience. Here, the user's experience is optimized by making available the most common scenarios for the user. This is effectively directed to giving the user the functionality that they want first, and then, through the background download process, providing the code that implements functionalities that the user might use in the future. To determine which functionalities a user desires to have first, an automated scenario-based packaging process is provided that runs against file usage logs from scripted scenarios.

All of these considerations and the inventive solutions directed to addressing the considerations are discussed in detail in the sections that follow below.

Package Manifest Definition

In the described embodiment, a package manifest (PKG file) comprises a list of files that are utilized in a package. The list is advantageously compressed somewhat and digitally signed. Each package manifest can contain a list of one or more files each of which can include an associated hash, as well as download directives that control caching of the files. Once an extension is authored, a software tool can be used to generate the package manifest.

In addition, the package manifest can specify several other pieces of information:

File Group

All files in an extension can be labeled according to a number of predefined file groups. The file group of a particular file determines when the particular file gets downloaded, where it is stored on the client, and how it gets packaged. In the described embodiment, four predefined file groups are provided and are listed and described in the table immediately below:

| Group name | When downloaded | Where stored on the client | Packaging | Content |
|---|---|---|---|---|
| Required | Downloaded before any other files in the extension. | NetDocs package cache | All required files in an extension are packaged together as a CAB* file. | DLLs included so that a user will not have to wait for a prolonged period of time before clicking on a UI element |
| Offline | Offline files start getting downloaded as soon as Required are down. Providing the user stays on line long enough, these files will all get downloaded and will later be available for offline use. | NetDocs package cache | File are sent down individually. | Bulk of the UI files. |
| On demand | Only downloaded when they are requested for the first time. | NetDocs package cache | Files are sent down individually. | To avoid using up disk space on the client, advanced features can be put in this category. |
| Online only | Downloaded on demand. Content is only available when the user is online. | WinInet Cache | Files are sent down individually | Content that is not to be provided offline. Examples include help pages and other content that can consume a large amount of disk space. |

*CAB stands for the CABinet technology that Internet Explorer uses to package bits for download. CAB files average from 2 to 3:1 compression, and are optimized for quick expansion. CAB files have the added security benefit that they are easily signed.

File Download Priority

Files in each group are listed according to the order in which they should be downloaded. This download order is implicit in the ordering of the files in the package manifest, an example of which is shown in FIG. 6.

Hash Value for Security/Versioning

Individual files in the package manifest can have an associated hash value. Each hash value is generated by running the file through an encryption algorithm. An exemplary encryption algorithm is Microsoft's CryptoAPI. In the illustrated example, each file can be listed with a base 64-encoded hash value, so that the file can be validated once the content arrives at the client. Specifically the package manifest is sent to the client in a secure manner (i.e. it is digitally signed). The package manifest contains the hash values for individual files. When the individual files are received by the client, each of the files can be run through the same Crypto API that was used to provide the hash values in the package manifest. If the hash values for a particular file compare favorably, then the file has not been altered and is secure.

Figure 7:
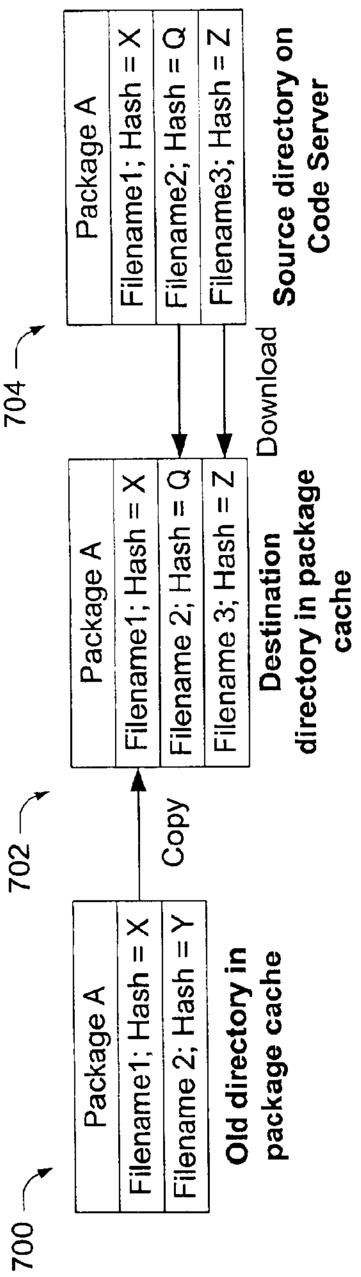
FIG. 7 is a block diagram illustrating how file hashes can be used for versioning in accordance with one embodiment.

When a file is updated, hash values can serve a useful purpose in identifying files that have not been changed between different versions of an extension. Consider FIG. 7, for example. There, an old directory 700 in a client package cache contains package A which; include two files—file 1 with hash=x, and file 2 with hash=y. Assume that this package is associated with an older version of an extension. When an updated version is produced, its package manifest is delivered to the client. The updated extension version is represented on a source directory of a code or web server 704. The package manifest includes the hash values for all of the files in the new extension version. A new client destination directory 702 is defined for all of the files of the new extension. If any of the hash values for files in the new extension are the same as the hash values of the files in the old directory 700, then those files can be copied directly from the old directory 700 to the new destination directory 702. In this example, file 1's hash value is the same as the hash value for file 1 on the source directory 704, so it can be copied into the new destination directory 702. File 2's hash value, however is different from the hash value for file 2 on the source directory, so it is not copied from the old directory 700. Rather, file 2 is downloaded from the code server. A new file 3 has been added and is also downloaded from the code server. Hence, in this example, a new version of an extension resulted in a download of less than all of the files in the extension version. This is because hash values for each of the files in the old extension version were able to be compared with hash values of the files in the new extension version. Those hash values that are the same indicate files that have not changed as between versions.

Using hash values for versioning has two important advantages over traditional versioning schemes. First, the update process is automatic. That is, with an explicit version number, it is possible to forget to update the version number when shipping a new release of a file. Using hash values avoids this problem. Second, versioning does not rely on file types. Specifically, traditional versioning schemes commonly embed version information within files; however, not all files (e.g. GIF files) support embedded version information. In the present example, using hash values for versioning does not depend on whether a particular file type supports or does not support embedded version information. In addition, the version information can be stored separately from the file itself Thus, access to actual file to determine whether it is current is not needed.

Total Storage Size of Package

The total storage size of a package is useful at download time to verify that the user has sufficient disk space.

ClassID's for the DLLs

Listing ClassIDs for each DLL is necessary to enable script writers to create classes by scripting against the OM. Additionally, this enables a determination of which package contains the code for a particular class.

DLL Load Dependencies

The reason for the dependencies section is to allow for legacy code that relies on being loaded by virtue of being in the search path of some other dll. In this case we have to make sure that the dependency dll is in the package cache directory before the dependant dll is loaded. FIG. 6 shows an exemplary package manifest 600 that is defined in a hierarchical tag-based language. Advantageously, the tag-based language comprises XML which is desirably extensible and flexible. In this example, a number of tags are provided in a hierarchical arrangement. The "package" tag contains information about the size of the package. The "files" tag is a child of the "package" tag and contains information about the file groups that are contained in that particular package. The "file" tag is a child of the "group" tag and contains information about specific files that comprise the extension, i.e. file name and hash value. A "dependency" tag is provided as a child of the "file" tag and lists any dependencies as discussed above. A "COMClass" tag is also provided as a child of the "file" tag and contains IDs as mentioned above. The ordering of the file groups in this schema implicitly defines the download order of the files.

Package Delivery

To optimize package delivery, two different delivery schemes are utilized First, a throttled download approach is utilized using known throttling download techniques. Here, considerations such as available bandwidth and media over which the extensions are being provided are considered.

Second, a background download approach is utilized. Background downloads enable a user to continue to work within an application program while content is downloaded. Foreground downloads are used when the user has explicitly requested a file/extension by clicking, for example, on an extension link, or requested an action, for example, by clicking on the "Compose" mail button, that requires download of files which are not available locally.

Figure 8:
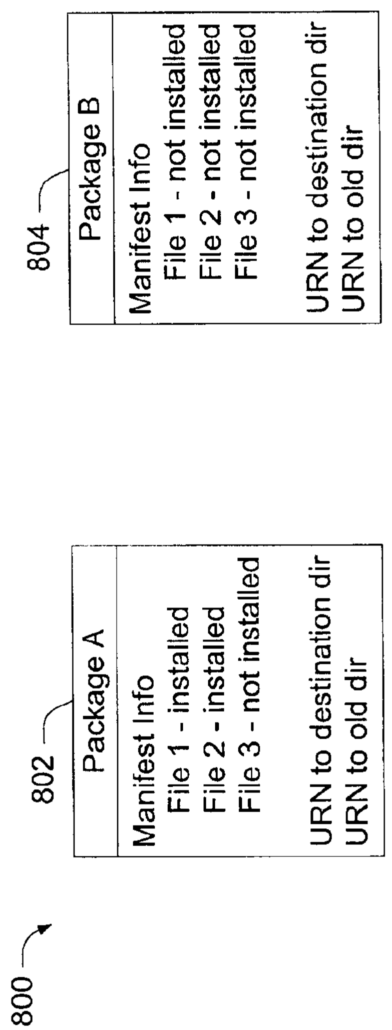
FIG. 8 is a block diagram that illustrates two exemplary package objects in accordance with one embodiment.

Along with background downloads, a queue management feature is provided. Specifically, when an extension must be installed or updated, a package manager, which is essentially a software component that manages packages, is provided with the following information:

- URL for the package manifest information on a code server
- URN for package destination directory in the package cache at the client
- (Optional) URN for the old package directory (if one exists) in the package cache From this information, the package manager creates a package object and adds the package object to a download queue. The download queue is designed for easy rearrangement of a package download order. Consider, for example, FIG. which shows a portion of a download queue 800 that contains two package objects—package object 802 (corresponding to package A) and package object 804 (corresponding to package B). The package objects maintain a list of which files of a corresponding package have been downloaded or installed. In the present example, files 1 and 2 from package A have been installed while file 3 has not been installed; and files 1, 2, and 3 have not been installed from package B. The download queue can be rearranged based on what the user is doing. That is, based on the actions that a user takes, the priority of files that are to be downloaded can be changed. In this example, the package manager is designed to process the first uninstalled file in the package at the head of the download queue. If, however, the user starts to use a file in an extension that is different from the extension whose files are at the head of the download queue, the corresponding package for the file that the user has started to use can be moved to the head of the download queue. Because a file's package is specified by its URN, the file's package can be quickly identified and located in the download queue. For example, and considering FIG. 8, if one of the files in package B is requested before the package manager has started to install package A's third file, then package B will be moved to the head of the download queue.

Figure 9:
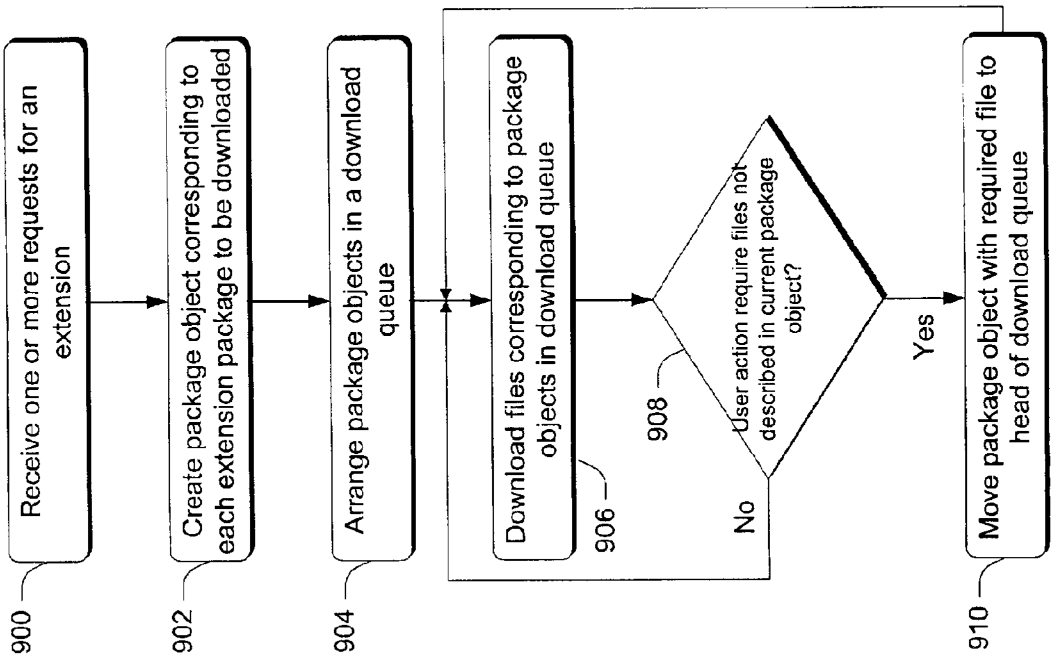
FIG. 9 is a flow diagram that describes steps in a method in accordance with one described embodiment.

FIG. 9 is a flow diagram that describes steps in a download queue management method in accordance with the described example. The method can be implemented in any suitable hardware, software, firmware or combination thereof. In the present example, the method is implemented in software.

Step 900 receives one or more requests for an extension. The requests can be generated in any suitable way. Step 902 creates a package object that corresponds to each extension package that is to be downloaded. Step 904 arranges the package objects in a download queue. Step 906 then downloads files corresponding to the package objects in the download queue. This step can be implemented by, for example, starting at the head of the download queue and downloading files until all of the files for a package object have been downloaded, and then moving to the next package object. Step 908 ascertains whether a user action requires a file that is not described in the current package object. If the user's action does not require a file not described by the current package object, then the method branches back to step 906 and continues to download files associated with the current package object. If, on the other hand, the user's action requires a files that is not described in the current package object, then step 910 moves the package object associated with the required file to the head of the download queue and begins to download files associated with this newly-repositioned package object. This step can be implemented by ascertaining which package object is associated with the required file by ascertaining the URN associated with the file. This URN specifies the file's package so that its package object can be quickly located and moved to the front of the download queue.

Package Creation

One of the innovative features of the described embodiment is its extensibility. That is, a software platform is provided in the form of an application program that can be extended by various third-party user-defined extensions. These extensions are delivered via the Web and are integrated directly into the software platform. In order to provide an organized delivery process, packages should be created in a uniform manner so that they can be predictably handled and integrated into the software platform.

In accordance with the described embodiment, each package should correspond to an end-user feature. For example, in the patent application incorporated by reference above, separate packages are provided for each of the email, contacts, document authoring, and planner functionalities. If packages that do not depend on one another share a dependency, then this shared dependency should become its own package. For example, there is no reason why the email and document authoring functionalities should depend on one another, yet both of them require the ability to publish content. By separating the publishing functionality into its own package, a certain amount of download order flexibility is preserved. Depending on what the user starts to work on, the files corresponding to the email functionality or the document authoring can be downloaded first.

Figure 10:
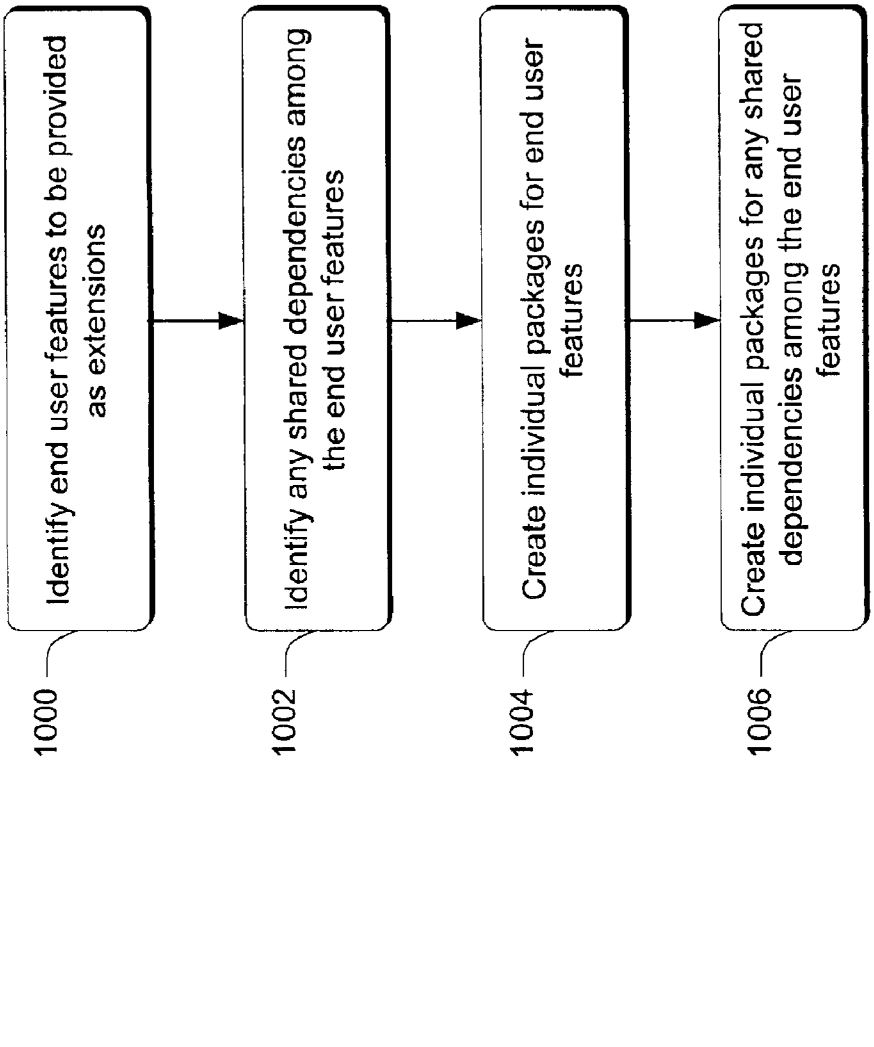
FIG. 10 is a flow diagram that describes steps in a method in accordance with one described embodiment.

FIG. 10 is a flow diagram that describes steps in a package creation method in accordance with the described example. The method can be implemented in any suitable hardware, software, firmware or combination thereof Portions of the method might, however, be implemented manually.

Step 1000 identifies end user features that are to be provided as extensions. Step 1002 identifies any shared dependencies among the end user features. Step 1004 creates individual packages for the end user features. Step 1006 creates individual packages for any shared dependencies among the end user features.

Automated Package Manifest Creation Tool

Advantageously, and in accordance with one implementation, an automated package manifest tool is provided and takes various input parameters and automatically creates a package manifest. The tool can be available to third parties to assist them in creating a package manifest.

Figure 11:
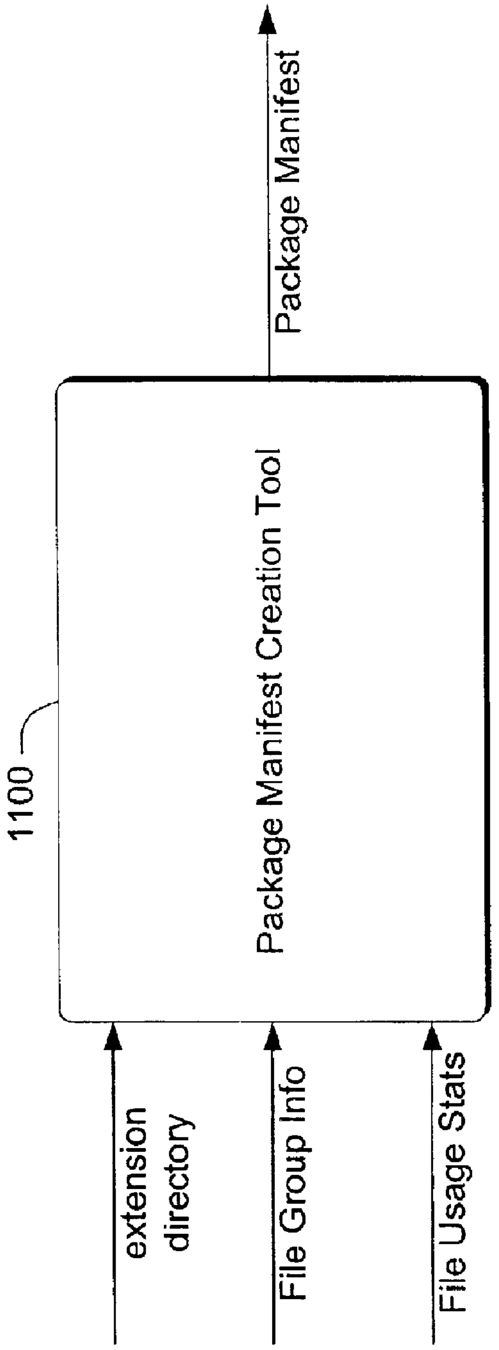
FIG. 11 is a block diagram that illustrates an exemplary package manifest creation tool in accordance with one described embodiment.

FIG. 11 shows an exemplary package manifest creation tool 1100 that is desirably implemented in software. In this specific example, the tool can take the following input parameters (some of which are optional):

Extension directory

File group information and DLL load dependencies (Optional)

File usage statistics from scenario runs (Optional)

The extension directory input parameter specifies the directory containing all of the files that will be described by the package manifest. If this is the only parameter, then tool 1100 will generate a manifest in which the EDF and DLLs in the directory are listed in the "Required" set, and all other content is "Offline".

The file group information and load dependencies parameter is optional. If an extension author has an idea of the categories in which his or her files should be placed, the categories should be specified here. For example, the author of the template manifest shown below knows that he wants his error handling GIF to be included in the package's required set. His choices here will always be respected in the final manifest. Additionally, if the extension author knows of any DLL load dependencies, these should be specified here as well.

```
<?xml version="1.0"?>
<Package>
    <Files>
        <Group Name="required">
            <File Name="bar.dll"/>
            <File Name="foo.dll"/>
                <Dependencies>
                    <File Name="bar.dll">
                </Dependencies>
            </File>
            <File Name="myextension.edf"/>
            <File Name="errorhandling.gif">
        </Group>. . .
    </Files>
</Package>
```

The file usage statistics from scenario runs parameter is an optional parameter. This parameter enables the file download priority to be determined based on scenario runs. A scenario is a script of tasks that the average user typically follows when using a product during a particular portion of product use. For example, one scenario might pertain to the tasks involved in sending an email message (i.e. click "new mail" button, type in "TO" well, type is "Subject" well, etc.). In the described embodiment, file usage statistics from scenario runs are collected from running IIS logs on various scenarios. The different scenarios are directed to ensuring, with some degree of probabilistic support, that the file download order reflects, in some way, the files that will likely be used by the user first.

It will be appreciated that the file usage statistics can be provided dynamically by building a knowledge base that describes the actual tasks that people typically accomplish. The information that is maintained in the knowledge base can then be used to generate and adapt download scenarios that actually conform to patterns that are established across a user base.

If extension writers want to pass the package manifest creation tool 1100 this information, they need to specify the log directory, as well as the start and end dates of the section of the log that the tool should analyze. For third parties, the download priority order within a group will be the order in which the group's files were requested in the logs across all scenarios.

In one implementation, the approach is somewhat more sophisticated. Additional information (in addition to the scripted steps) is stored in the IIS logs and includes scenario priority and checkpoints. The scenario priority is a priority that is assigned for each scenario. So, for example, if one scenario is ten times more important than another scenario, this information can be maintained. The priority (e.g. a rating from between 1 to 100, with 100 being the highest priority), should be equal to a best guess as to the percentage of the time that users will step through the scenario, assuming they use the extension at all. Checkpoints provide a way to separate one scenario from another. For example, checkpoints designated as "Offline" and "Shutdown" can be automatically added at the beginning and end of the scenarios, respectively, so there can be a differentiation between scenario runs in the log. Additionally, script authors can optionally use checkpoints mid-scenario to indicate a change in group priority, e.g. part of a scenario script could be labeled as an "On demand" feature and another part could be labeled as "Offline".

Figure 12:
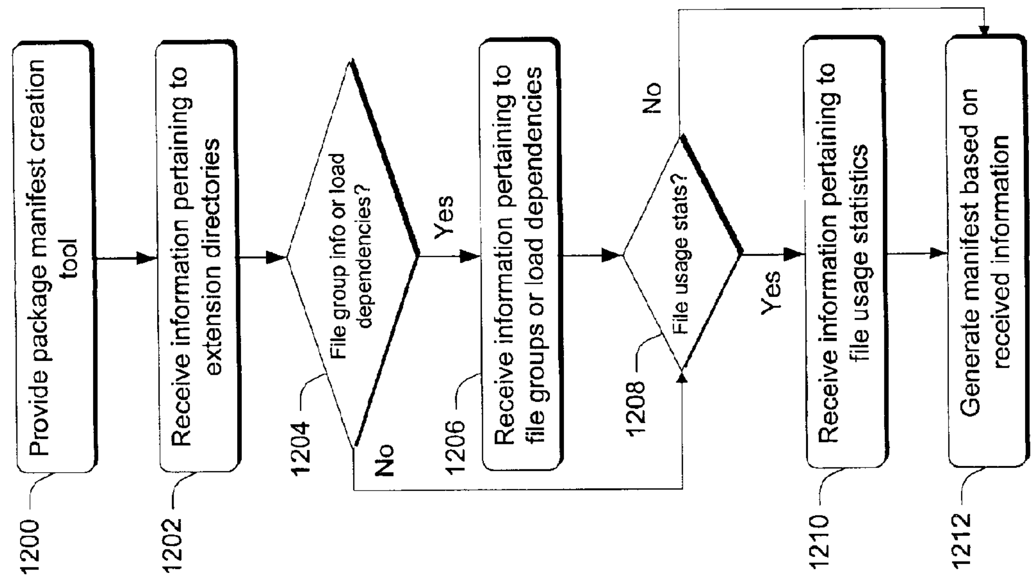
FIG. 12 is a flow diagram that describes steps in a method in accordance with one described embodiment.

FIG. 12 is a flow diagram that describes steps in a package manifest creation method in accordance with the described example. The method can be implemented in any suitable hardware, software, firmware or combination thereof. In the described example, various steps of the method are implemented by a manifest creation tool that is implemented in software.

Step 1200 provides a package manifest creation tool. This tool can be a software tool that resides on an extension author's machine. Step 1202 receives information pertaining to an extension directory as a first input parameter. Step determines whether there is any file group information or load dependency information provided by the extension author. If there is, step 1206 receives the information as an input parameter. Step 1208 determines whether there is any file usage statistic information. Such information can be provided, in one embodiment, through the use of scenario runs as described above. If such information is provided, then step 1210 receives the information as an input parameter. Step 1212 then uses all of the information provided as input parameters to generate a manifest automatically.

Exemplary File Ordering Heuristics Based on File Usage Statistics

Figure 13:
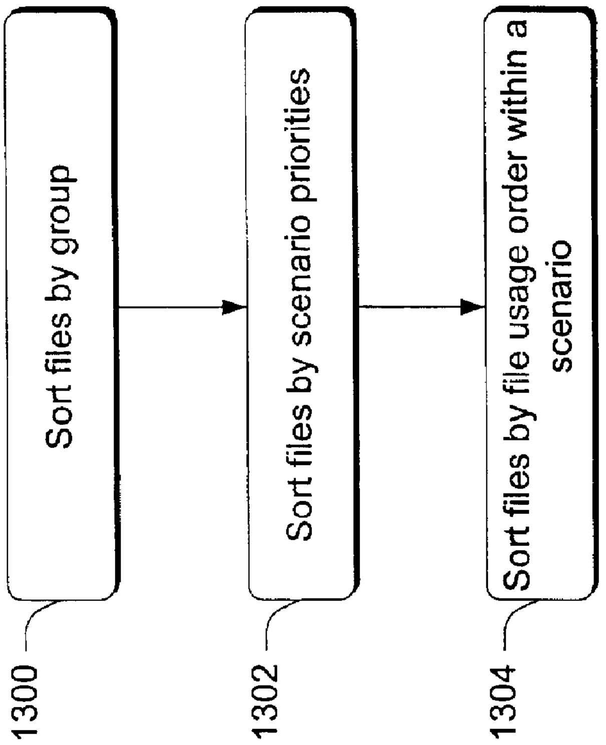
FIG. 13 is a flow diagram that describes steps in a method in accordance with one described embodiment.

FIG. 13 is a flow diagram that describes but one exemplary file ordering or sorting heuristic in accordance with the described embodiment. It is to be understood that this specific example constitutes but one way of ordering files for download. Accordingly, other heuristics can be used without departing from the spirit and scope of the claimed subject matter.

Step 1300 sorts files by file group. Recall that in the illustrated example above, files can be grouped in one of four possible groups: Required, Offline, On Demand and Online Only. A file's group is determined first by the manifest, and, if it does not provide any group information, then by the highest priority group that it uses, according to checkpoint information in the log. Files in the "Required" set should not be considered because their order is already known. If no group information is included about a file, then an assumption is made that the EDF and all DLLs are "Required" files and all other files in the directory are "Offline".

Consider, for example, the following initial file usage information for three different scenarios:

Scenario 1 file usage: 1) FileA.gif, 2)FileB.xml, 3)FileE.dll

Scenario 2 file usage: 1) FileC.xml 2) FileA.gif

Scenario 3 file usage: 1)File D.js, 2)FileA.gif

Scenario 1=priority 80

Scenario 2=priority 80

Scenario 3=priority 40

In this example, there are three scenarios that have files associated with them. Each of the scenarios has a priority with which it is associated. The files are first sorted by group (step 1300). Recall that in this ordering heuristic, DLLs are "Required" and all other files are considered "Offline". This provides the following sorted files:

Required files

FileE

Offline files

FileA, FileB, FileC, File D

Step 1302 sorts files based on scenario priorities (from highest to lowest). Higher priority files are ordered so that they are downloaded first. This step provides the following sorted files:

Required files

FileE

Offline files

Priority 80 group: files used by Scenarios 1 & 2=File A, File B, and File C

Priority 40 group: files used by Scenario 3 (that are not already listed)=File D.

Step 1304 then sorts the files by file usage order within a scenario run. For each priority grouping with more than one file, the files are sorted according to the average order in which they were downloaded within scenarios of their labeled priority. Scenarios with a smaller average usage order will be downloaded earlier. Ties are broken based on the order in which the scenarios appear in the input file. As an example, consider the following:

File A: average order=(Scenario 1 order+Scenario 2 order)/2=(1+2)/2=1.5.

File B: average order=(Scenario 1 order)/1=(2)/1=2.

File C: average order=(Scenario 2 order)/1=(1)/1=1.

Here, file A got used first by scenario 1 and second by scenario 2 for an average of 1.5, and so one. File C has the smallest order number so, of the Offline files, it is sent first. The final file order is shown below:

Required files

FileE

Offline files

FileC, FileA, FileB, File D

Code, Components and "Bits"

The following files and resources can be, but need not be included with an extension. This list is not exclusive, as other resources can certainly be incorporated into an extension.

Customized UI and keyboard shortcuts

Components and Behaviors

XML browsing and editing components (including XSL and business logic objects)

Static pages or other resources

Third-party defined custom content

Users install extensions by navigating to a network site for the extension. In an Internet implementation, the user navigates to an appropriate URL for the extension. Hosting administrators can also "push" extensions so that users can automatically receive them by adding an entry into the appropriate users'"Preference" settings.

Platform Set Up and Extension Installation

Figure 14:
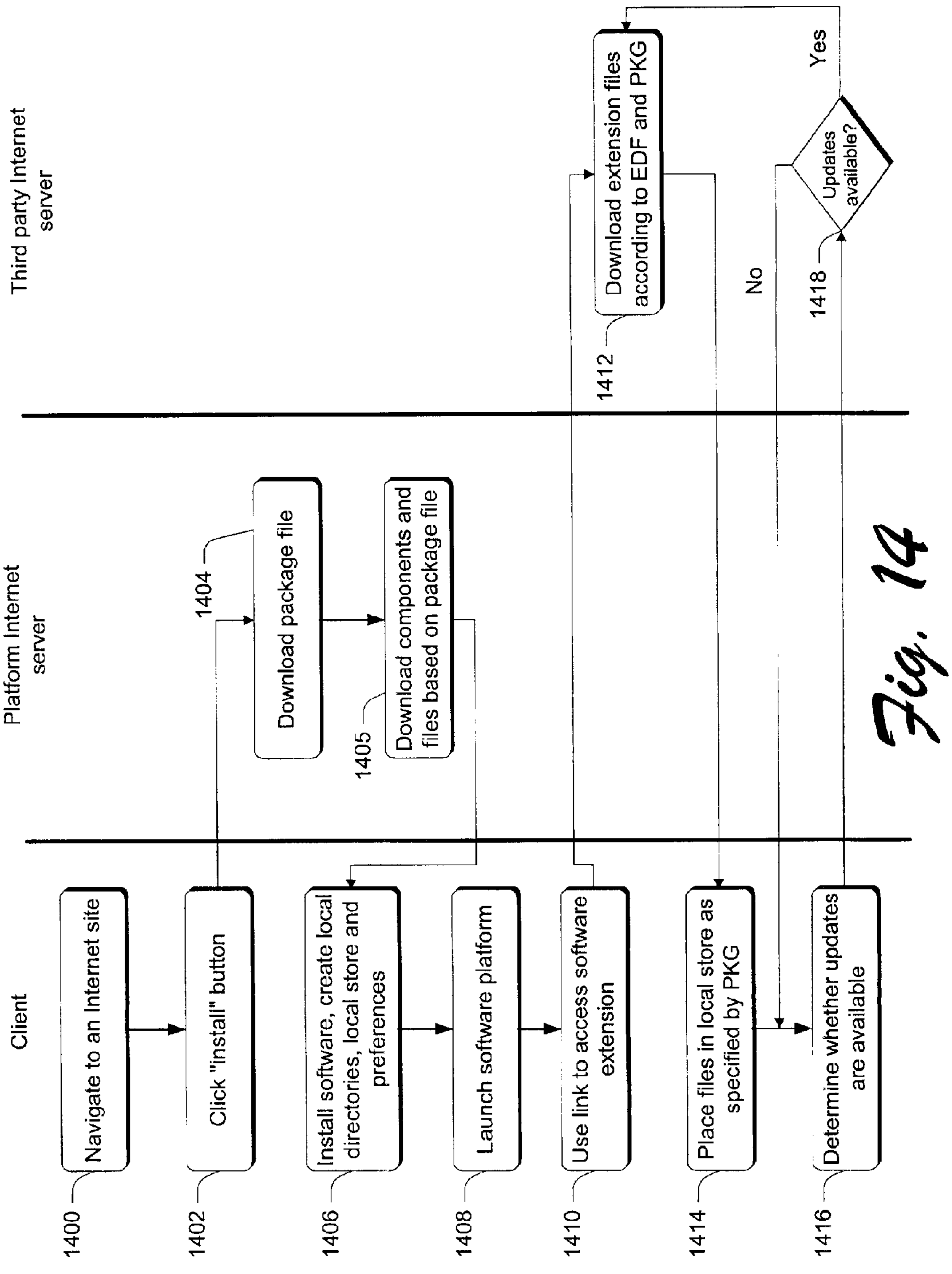
FIG. 14 is a flow diagram of steps in a method in accordance with the described embodiment.

FIG. 14 is a flow diagram that describes exemplary steps in a set up and extension installation process in accordance with the described embodiment. This example describes an Internet-based example. In the illustrated example, various extensions are maintained at or accessible through various Internet sites. The extensions are deliverable via the Internet to a client. It will be appreciated that the illustrated division of computers may not necessarily exist at all. For example, all of the functionality embodied by the computers may reside on one machine, or the extension may be local, or the platform and the extensions may be on the same machine, etc.

The flow diagram, in this example, is illustrated in connection with three separate "zones", one of which represents a client, one of which represents a "platform" Internet server, and one of which represents a third party Internet server. The acts that are described in connection with the different zones are performed, in this example, by the entities assigned to the zone. In some configurations, one or more of these zones may overlap. For instance, the platform server may be the same device as the extension server.

Step 1400 navigates a user to a particular Internet site that is associated with the software platform that is to be utilized as the foundation for extension installation described below. In step 1402, the user clicks an "install" button that sends a message to the software platform server that indicates that a user wishes to install the software platform. This step can be an optional step. Steps 1404 and 1405 then download the software associated with the software platform to the client. In the illustrated example, step 1404 downloads the package file for the single navigable window application and based on that file's contents step 1405 downloads other components and files to the user's computer. Step 1406 installs the software code on the client machine and can create local directories for the application cache, a local store and preferences. It will be appreciated, however, that local directories or preferences are not necessarily needed. Step 1408 launches the software platform.

The steps described immediately above constitute steps associated with an initial set up in which the software code for the single navigable window application is delivered to and installed on a client machine. The steps described immediately below are associated with extension installation.

Step 1410 uses a link that is associated with an extension to access the extension. This step can be implemented by a user navigating their browser to a particular Internet site through which one or more extensions can be accessed. Alternately, a reference to the link can be placed in the user's preferences or the preferences of a computing group with which the user is associated (e.g. the system administrator can place a reference in a group's preferences). The link can advantageously be associated with a third party Internet server or Internet site. Step 1412 downloads extension files according to the PKG associated with an EDF. The files are delivered to the client and step 1414 places the extension files in a local store as specified by the PKG specification. At this point, an extension is installed and the user can utilize the functionality provided by the extension. Step 1416 determines whether extension updates are available. This can be done by periodically polling an extension catalog (discussed in an "Extension Catalog" section below) to ascertain whether there, are any updates to various extensions. Alternately, notifications might be automatically sent to the client so that the client is aware of updates or any other method might be used to determine if updates are available. If there are updates available, step 1418 branches to step 1412 which downloads the extension files associated with the update and installs them on the client.

Developing Extensions

Developing extensions for the software platform is a fairly straight-forward process. A developer develops the extension content using a tool such as Notepad or other tools such as Visual Studio. The extension is then described in an EDF and PKG and the PKG is digitally-signed and then optionally compressed. The extension can then be hosted on a particular network server.

FIG. 15 is a flow diagram that describes steps in an extension development method in accordance with the described embodiment. One or more of these steps can be performed by a software developer or organization that creates a particular extension. Some of the steps are implemented in software. Step 1500 develops an extension. Any suitable tools can be used to develop the extension. Step 1502 then creates an extension definition file (EDF) for the extension. The EDF, in this example, is defined using XML as discussed above. Other formats can, of course, be used to describe the EDF. Step 1504 creates a package manifest (PKG) for the extension. The PKG, in this example, is defined using XML as discussed above. Step 1506 then hosts the EDF and PKG :on a network server such as an Internet server. Additionally, the associated extension files that are described in the PKG can also be hosted by the network or Internet server (step 1508). Having accomplished the above, users can now navigate to an EDF directly (using, for example, the associated URL or some other network address), which then installs the extension by caching any required files locally and placing a reference to the extension in the user's preferences.

Specifically, step 1510 delivers the EDF and PKG files to a client. This step can be implemented by a user navigating to a particular Internet site where the appropriate files are hosted and then downloading the files. Step 1512 delivers the extension files that are associated with the EDF and PKG files to the client, whereupon they can be installed and used.

Extension Catalog

One optimization, discussed briefly in connection with FIG. 14, is an extension or EDF catalog which provides an additional level of indirection to the EDF. An EDF catalog allows organizations to group extensions and provides a single place to determine when an extension changes. The desired extension can be automatically selected from the catalog by the software platform based upon the user's settings. The catalog can be queried to determine which extension is most appropriate for the user.

In the described embodiment, a catalog is an XML file that contains mappings from extension URNs to one or more package URNs based upon language, version or other attributes. Catalogs can, however, be defined using any suitable format. Catalogs can provide:

- The ability for a hosting organization to update version information for one or more hosted extensions in a single place
- Optional automatic indirection to correct version based upon user's settings. For instance, a catalog may list several versions of an extension for different languages. The catalog file can be processed to find the version of the extension that matches the user's language settings.
- Optional automatic upgrade to new versions of extensions as they become available Like EDFs, catalogs can be compressed and digitally signed to prevent tampering. By subscribing to a catalog in order to detect changes for one or more hosted extensions, the number of server pings required from the client (or notifications to the client) in order to discover extension updates can be reduced.

FIG. 16 shows an exemplary XML catalog structure. Entries in the catalog can be structured as follows:

| Attribute | Type | Required | Description |
|---|---|---|---|
| extensionURN | uri | Y | Identifier for an extension. There may be more than one entry for a given extension urn in a single catalog representing different versions, languages, etc. |
| name | String | N | Friendly name for an extension. |
| packageURN | uri | Y | Required urn for the package. Package urn corresponds to a discrete set of bits. It is different from the extension urn: For each user, the extension urn (name) corresponds to a specific set of files based upon language preferences and version. This means that, for shared machines, different users may have different extensionURN to packageURN maps based upon their preferences. |
| packageURL | uri | Y | url of the digitally signed compressed file containing the PKG file is required. |
| language | String | N | Language is an optional language specifier. |
| version | String | N | Version is an optional version specifier |
| defaultLanguage | String | N | DefaultLanguage is an optional attribute specifying the default language package. For a given version of an extension, there should be only one entry with DefaultLanguage attribute. |
| defaultVersion | String | N | DefaultVersion is an optional attribute specifying default version for an extension. For a given extension urn and language attribute there should be only one entry with DefaultVersion attribute. |

In this particular example:

The default language of the netdocs-planner is the English version.

The default English version is 1.1. The default French version is 1.0. If there is no version available in the user's specified language on the platform, they will get the English version 1.1 by default.

The English version of netdocs-planner has been upgraded from V1 to V1.1.

There is also a French version. The extension URN is the same as the English version. There is no 1.1 release for French yet, so 1.0 is the current version for French speaking users.

A query against the catalog returns only the rows where language matches the user's language preferences. The query would also return all rows where language is the user's language or default='yes' and throw out duplicates for the same name.

Architecture

In the described embodiment, one of the aspects that provide desirable utility is the extensibility of the software platform. That is, third and fourth party developers are free to develop their own extensions which can then be used within the framework of the software platform. The extensions are integrated directly into the software so that the platform's functionality is modified by the extensions. Recall that in order to provide an extension, the developer simply authors the extension, describes their extension in an EDF and PKG, and then hosts the EDF, PKG, and associated files on a network server.

The EDF, as pointed out above, can be defined in an XML schema that includes a root node (i.e. the "extension" tag) and one or more child nodes. In this particular example, the child nodes generally correspond to the individual extension feature types that are desired for incorporation into the software platform. For example, recall that Tables 1–3 above describe various exemplary predefined feature types that can be added through an extension using the predefined XML schema.

Consider now a developer who wants to add two menus and a toolbar to the software platform. The menus and toolbar might be associated with a retail store that maintains a Web site for its customers. The retail store might want a customer who visits its Web site to be presented with a UI that is unique to the retail store and provides services that are specifically,y tailored to the store. To do this, the developer develops two different menus, one of which might be associated with displaying the most recent specials, and other of which might be associated with providing a search mechanism through which the user can search for specific products. The toolbar might contain specific buttons that are unique to the retail store. A simplified EDF called "retail.edf" for the retail store's extension is shown directly below:

```
<edf:extension name= "retail extension" urn="extension.retail.com">
    <edf:menus>
        <edf:menu    url="url1.htm"/>
        <edf:menu    url="url2.htm"/>
    </edf:menus>
    <edf:toolbars>
        <edf:toolbar url="url3.htm"/>
    </edf:toolbars>
</edf:/extension>
```

Here, the outer "extension" tag designates this XML file as an extension. The inner "menus" and "toolbars" tags are top level tags that designate that the information between these tags pertains respectively to menus and toolbars that correspond to the extensions that the developer has added. The boldface "menu" and "toolbar" tags describe data pertaining to the actual extension and contain a URL that is associated with each extension as described above. The EDF above logically describes the extensions that are being provided as including two menus and one tool bar.

Consider also that the above EDF can constitute but one of many EDFs that are loaded into the system. Each EDF can contain one or more top level tags, each of which is associated with one or more specific extensions that are to be added to the software platform.

Figure 17:
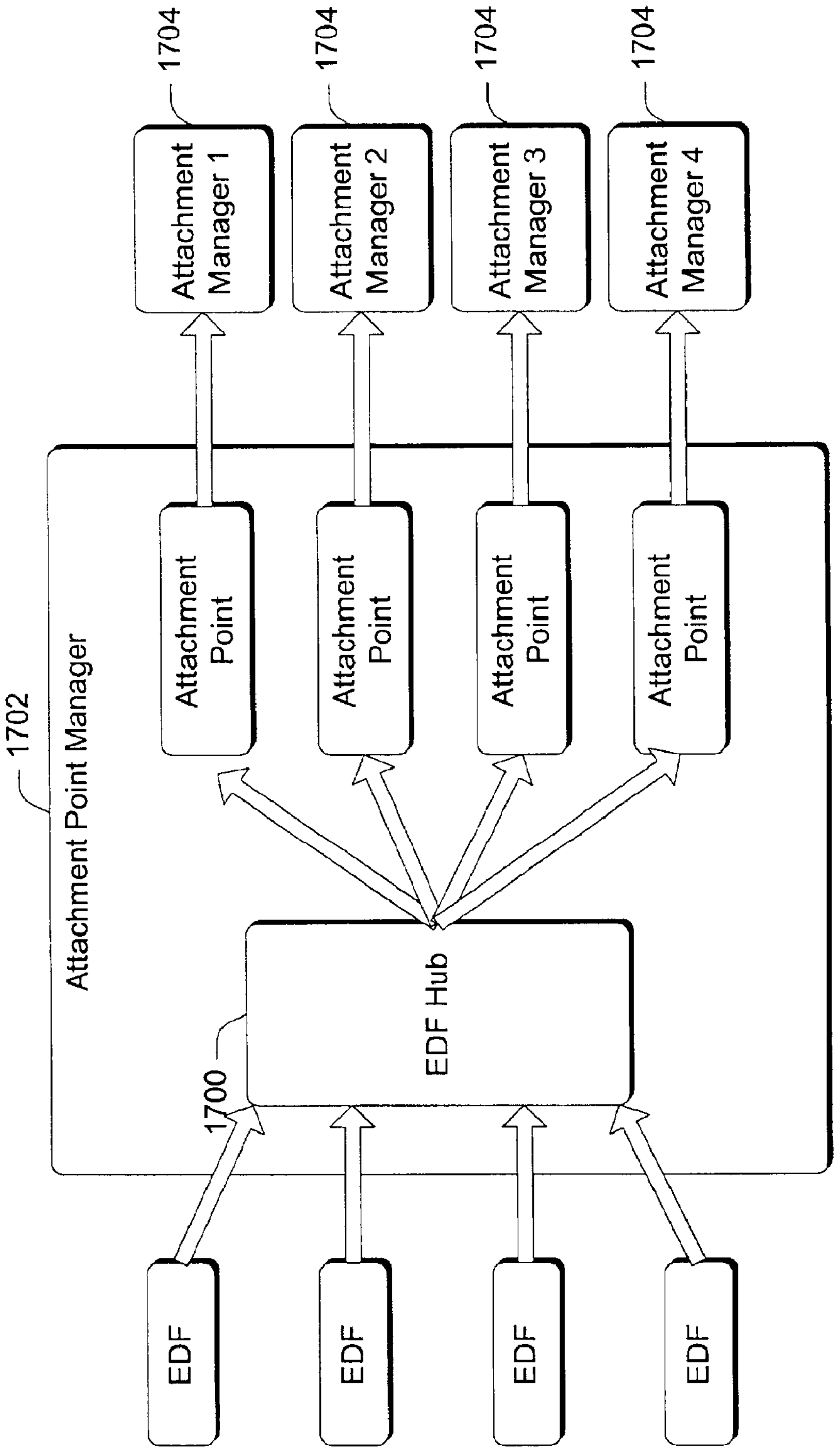
FIG. 17 is a block diagram of a software architecture in accordance with the described embodiment.

FIG. 17 is a block diagram of an exemplary software architecture that is configured to process multiple different EDFs so that the software components that are responsible for incorporating each particular extension into the software platform receive the appropriate information that is specific to their extension. This example is specific to the XML implementation that is discussed throughout this document. It is to be understood that other architectures, similar in functionality to the one discussed below, can be used in other implementations without departing from the spirit and scope of the claimed subject matter.

Utility objects, herein referred to as attachment points, are used to process the information from the multiple EDFs. An attachment point is simply a collection of objects that fire events to registered listeners as objects are added to or removed from the collection. Many types of attachment points can be created, but all take data from a source (often another attachment point), process it (either dynamically or statically), and expose the results of their processing. Some of the simplest attachment points include:

An XML attachment point, which loads an XML file and exposes the top-level nodes of the XML as objects in its collection.

A filter attachment point, that connects to another attachment point and exposes only those objects from it that meet some criteria.

A merge attachment point, that connects to one or more other attachment points and exposes all of their objects as one, merged collection of objects.

In the illustrated example, the architecture includes a collection of one or more attachment points, including a funnel structure known as an EDFHub 1700, an attachment point manager 1702, and multiple attachment managers 1704. The EDFHub 1700 receives all of the EDFs and merges them together and exposes them as a single list. Other individual attachment points provide mechanisms that manipulate (including filter, merge and expand) the single list that is exposed by the EDFHub 1700. Whenever a new extension or EDF is added to or removed from the EDFHub, the various attachment points will see to it that the appropriate attachment manager(s) is notified. This is done by firing events to the appropriate attachment managers. The attachment point manager 1702 creates, destroys and manages the various attachment points in the system and allows easy reuse of identical attachment points.

For each top level tag (i.e. "menus" and "toolbars" tags), there is a corresponding attachment manager 1704 that uses data provided by the attachment points to incorporate a particular type of feature within the software platform. Each attachment manager requests a set of attachment points from the attachment point manager 1702. These manipulate the data exposed by the EDFHub 1700. In the illustrated example, the attachment points can be requested as a predicate chain that the attachment point manager uses to create and build a set of attachment points that operate on the data exposed by the EDFHub 1700.

Figure 18:
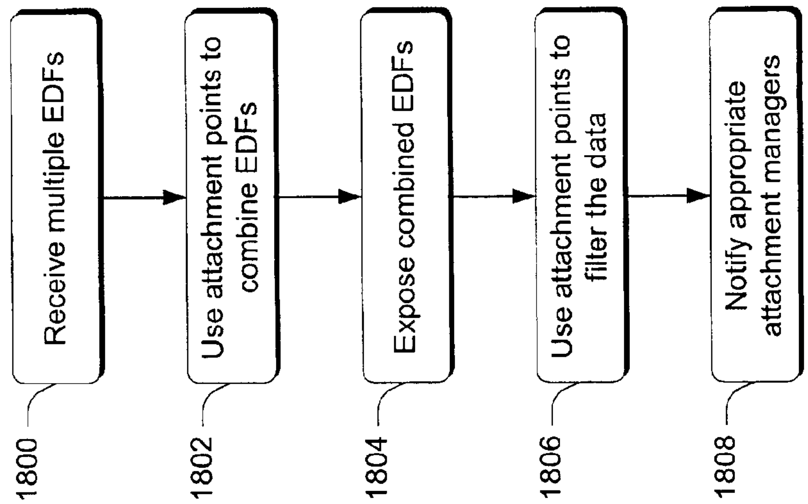
FIG. 18 is a flow diagram of steps in a method in accordance with the described embodiment.

FIG. 18 is a flow diagram that describes steps in a method in accordance with the described embodiment. The method is implemented in software and, in this example, by the software components of FIG. 17.

Step 1800 receives multiple EDFs. These files can be received in any suitable way. For example, a user can specify in their preferences particular extensions that they desire to be loaded when they are online. Alternately, a user might navigate using a link to a particular Internet site that recognizes that the user is executing a software platform that is configured to dynamically add the extensions. The EDFs, in this example, are funneled into the EDFHub 1700 which uses attachment points to combine the EpFs (step 1802). In this example, the EDFs are defined as XML files and the nodes are combined into one single XML list. Step 1804 exposes the combined EDFS. In this particular example, the EDFs are combined into a single XML list that is exposed to other various attachment points which then further manipulate that data (step 1806). One goal of the attachment points is to avoid having the attachment managers 1704 re-query the whole system every time an extension gets added or removed from the system. Thus, if an extension gets added or removed, the attachment points ensure that only the appropriate attachment manager 1704 is notified of the specific additions or deletions of the extension. For example, if an EDF indicates the addition of a menu, then only the attachment manager associated with menus is notified. Accordingly, step 1808 notifies the appropriate attachment manager of any new data that matches the attachment managers requirements.

Attachment Points and the Attachment Point Manager

Attachment points are objects that expose collections of ordered objects and fire notifications when new objects are inserted or deleted. In the exemplary system, the objects are XML nodes, but they could be any type of object. Although there are many types of attachment points, they all follow a similar process:

1) Initially attach to one or more data sources. These could be files or, commonly, other attachment points.

2) Process the data based on some logic. Usually the logic is quite simple and could involve something like filtering the objects based on some criteria.

3) Expose the results of the processing step 2 in a new collection of objects.

4) Fire events to indicate how the exposed collection of objects changed (OnInserted(index, count) or OnRemoved(index, count).

5) Optionally, continue to listen for changes in the data sources and repeat step 2–4 when changes occur.

Alone, each attachment point is quite simple, but when different types of attachment points are combined to form "chains", where one attachment point processes data from a second attachment point, the processing can be quite powerful. This is especially true if the attachment points only process the changed data in step 2, since they only do a small amount of simple work at any one time. In the exemplary system, this incremental processing means that the whole system does not have to be re-queried when a new extension is installed or when an existing extension is removed. Additionally, each attachment manager in the exemplary system uses a specific chain of attachment points and so is only informed of changes that impact its area of extensibility.

The attachment point manager performs two important functions when building chains of attachment points. First, it allows the chains to be described as predicate strings. The attachment point manager interprets these strings and builds the required chain of attachment points. Second, it allows the reuse of identical attachment points, which makes the system more efficient. As the attachment point manager creates each chain of attachment points, it tracks which predicate string corresponds to which attachment point. If that predicate string is later requested again, it simply reuses the existing attachment point without creating a new one.

As an example, consider that the attachment manager associated with menus has requested the following predicate chain of attachment points that utilizes the retail.edf file above: (Note: this example does not assume the presence of an EDFHub attachment point).

Explode(Filter("menus", Explode URL ("retail.edf"))))

This string represents all of the menus in the retail.edf file. The XML file located at retail.edf is loaded by the URL attachment point which exposes the root node of the XML file as the only object in its collection. The inner Explode attachment point uses the URL attachment point as its data source and exposes all of the children of the objects in that source collection. In this case, the children of the root node are the top level XML tags "menu" and "toolbars". The Filter attachment point uses the Explode attachment point as its data source and filters the exposed objects looking only for the nodes that are "menus". The outer Explode attachment point uses the Filter attachment point as its data source and exposes all of the children of the filtered menu nodes to provide a list containing the two menus that are added by the extension. Since this particular XML file contained menus that were identified by the attachment points associated with menu attachment manager, that attachment manager is then notified that two menus have been added by an extension.

Figure 19:
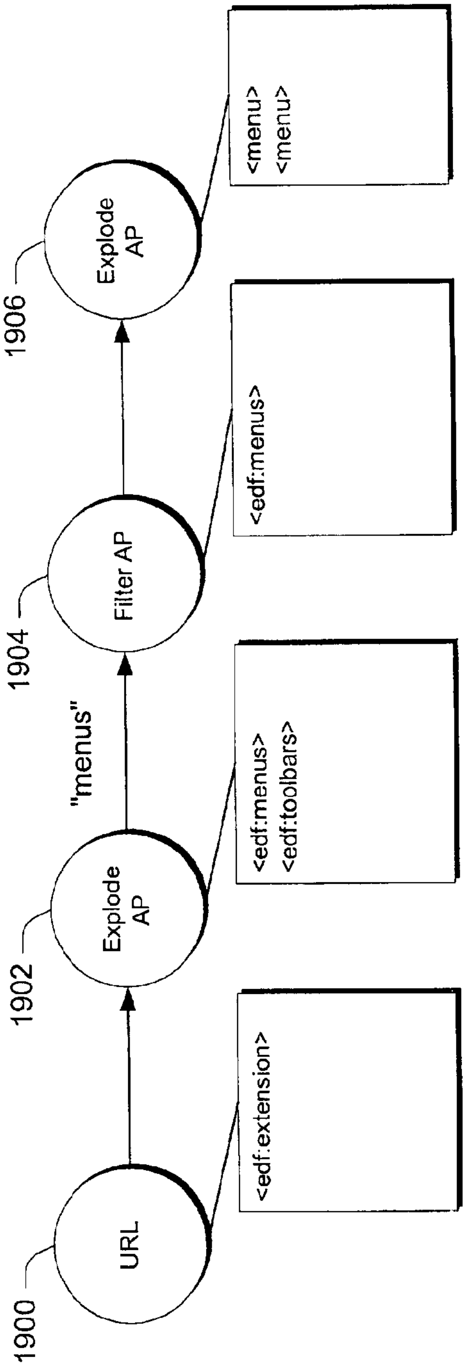
FIG. 19 is a diagram that illustrates one aspect of attachment point architecture in accordance with the described embodiment.

This process is diagrammatically illustrated in FIG. 19 which shows attachment points 1900, 1902, 1904, and 1906. Each attachment point exposes a list of XML nodes. URL attachment point 1900 takes an input (a URL to an XML file—e.g. retail.edf) and exposes a list of XML nodes. This list contains only the root node "<edf:extension>". Explode attachment point 1902 takes as an input attachment point 1900 and exposes a list of XML nodes which are children of source XML nodes. In this example, the list of XML nodes exposed by attachment point 1902 are the "<menus>" nodes and the "<toolbars>" nodes. The filter attachment point 1904 takes attachment point 1902 as an input and filters on "menus." It then exposes an XML list having only "<menus>" nodes in it. The explode attachment point 1906 takes attachment point 1904 as an input and exposes a list with the XML nodes that are contained in the "<menus>" nodes—here both of the "<menu>" nodes.

Consider additionally that the toolbar attachment manager would request a predicate chain of attachment points which would also use URL attachment point, an Explode attachment point and a filter attachment point 1904 that filters on "toolbars". Thus, the corresponding explode attachment point 1906 would expose an XML list containing only the "<toolbar>" node. But, the attachment point manager would detect the commonality of the URL attachment point and the inner Explode attachment point, so it would reuse the same attachment points it created for the menu attachment manager. The Filter attachment points used by the toolbar attachment manager and the menu attachment manager would use the same Explode attachment point as their data sources but would expose different collections of nodes, because they were filtering based on different criteria.

Figure 20:
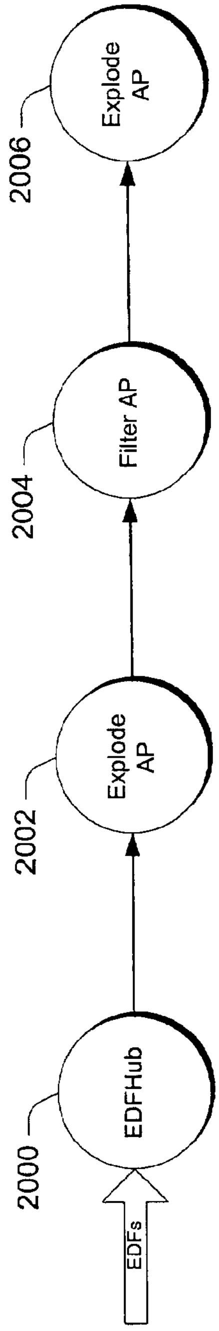
FIG. 20 is a diagram that illustrates one aspect of the FIG. 17 architecture.

Consider FIG. 20 which incorporates an EDFHub attachment point 2000. This attachment point receives all of the EDFs and, as discussed above, combines them into a single XML list. The EDFHub then exposes the root nodes of all of the EDFs. The explode attachment point 2002 then exposes an XML list that contains all of the top level nodes for all of the EDFs. As an example, there may be multiple EDFs that each contain top level menu nodes, toolbar nodes, accelerator nodes and the like. Explode attachment point 2002 exposes an XML list that contains all of these top level nodes for all of the EDFs. Filter attachment point 2004 can then filter the XML list exposed by the explode attachment point 2002 in accordance with any suitable parameters (i.e. filter on menu nodes, tool bar nodes, accelerator nodes and the like). The final explode attachment point 2006 then exposes a list of the individual children nodes of the list exposed by the filter attachment point 2004. This list describes all of the specific features (of the particular type that were filtered) that have been added by all of the EDFs.

The table below lists a number of different attachment points that can be utilized in accordance with this described embodiment but many more can easily be created.

| Attachment Point | Purpose |
|---|---|
| URL | Loads the URL and exposes the top level XML node as a member of the collection |
| Context | For every member, it gets the "expression" attribute and binds to it. If the expression evaluates to true, then the member is exposed. |
| EDF | Same as the URL AP, but also exposes a fabricated member with data to create an APP based on the URL and URN (which exists in the XML DOM). |
| Merge | Takes zero or more Attachment Points (of any type) and merges them together. The order and continuity of the original collections will be maintained. |
| Filter | Monitors a single Attachment Point and only exposes those nodes that match the specified name. The order of the original collection will be maintained. |
| Duplicate | Monitors a single Attachment Point and filters out any duplicates. A duplicate is defined to be having the same URN attribute. If no URN attribute is present then the node is exposed. Order of the original collection will be maintained. |
| Explode | Monitors a single Attachment Point and for every member exposes the children of that member as its members. The order of the original collection will be maintained as well as the order of the children within the nodes. |
| Link | Monitors a single Attachment Point and for every member looks for a URL attribute and creates a URL AP and merges it into itself. If the optional include Content is set to true, it will merge the original collection in as well. |
| Order | Monitors a single Attachment Point. For every member, it gets three attributes: id, before and after. Based on this information, it reorders the members as specified. If no ordering information is supplied, the order of the original collection will be maintained. |
| EDFHub | This Attachment Point is the central merge point that represents all the EDF points. |

Conclusion

The embodiments described above provide a platform solution that provides for customization and extensibility through a consistent and logical extensibility mechanism and object model that can be easily understood by third party developers. Internet-based downloads can be accomplished without a great deal of user intervention and without manipulating any user persisted settings. Extensions can be provided to a software platform or application program dynamically based upon the user's computing context.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for delivering software via a network comprising:

describing one or more software extensions using a hierarchical language, the extensions being configured for incorporation on a client, said describing defining one or more manifests containing at least one list of files comprising an extension; and delivering the one or more manifests to the client via the network, the one or more manifests being configured for use in downloading the software extensions via the network, at least some of the extensions being downloadable by streaming extension files to the client in a manner that enables a user to begin to interact with the extension sooner than if the user had to wait for the entire extension to load, said manner being developed based on scenario runs in which files that are more likely to be first used by the user are downloaded before files that are less likely to be first used, and wherein files that are less likely to be used first can be downloaded via a background download process.

2. The method of claim 1, wherein the one or more manifests are configured to assist in organizing delivery of individual files listed in the one or more manifests.

3. The method of claim 1, wherein the one or more manifests are configured to assist in validating individual files listed in the one or more manifests.

4. The method of claim 1, wherein the one or more manifests are configured to assist in updating individual files listed in the one or more manifests.

5. The method of claim 1, wherein the one or more manifests describe individual file locations.

6. The method of claim 1, wherein the one or more manifests contain individual hashes for one or more of the listed files.

7. The method of claim 1, wherein the one or more manifests contain download directives for downloading the listed files.

8. The method of claim 1, wherein the one or more manifests are defined in a tag-based language.

9. The method of claim 1, wherein the one or more manifests are defined in extensible markup language (XML).

10. The method of claim 1, wherein the network comprises the Internet.

11. One or more computer-readable media comprising computer-readable instructions thereon which, when executed by a computer, cause the computer to implement the method of claim 1.

12. A computer programmed with instructions which, when executed by the computer, implemented the method of claim 1.

13. One or more computer-readable media comprising computer-readable instructions thereon which, when executed by a computer, cause the computer to:

describe one or more software extensions using extensible markup language (XML), the extensions being configured for incorporation on a client, said describing defining a manifest containing at least one list of files comprising an extension, the manifest being configured to assist in one or more of the following: organizing delivery of individual files listed in the manifest, validating individual files listed in the manifest, and updating individual files listed in the manifest; and deliver the manifest to the client via the network, at least some of the extensions being downloadable by streaming extension files to the client in a manner that enables a user to begin to interact with the extension sooner than if the user had to wait for the entire extension to load, said manner being developed based on scenario runs in which files that are more likely to be first used by the user are downloaded before files that are less likely to be first used, and wherein files that are less likely to be used first can be downloaded via a background download process.

14. A method for receiving software via a network comprising:

receiving a manifest that contains at least one list of files comprising a software extension that is to be downloaded via a network and incorporated on a client, the manifest being defined in extensible markup language (XML), the manifest being configured to assist in:

organizing delivery of the files, validating individual files listed in the manifest, and updating individual files listed in the manifest; and downloading files from the list of files contained in the manifest;

wherein the extension is downloadable by streaming extension files to the client in a manner that enables a user to begin to interact with the extension sooner than if the user had to wait for the entire extension to load, said manner being developed based on scenario runs in which files that are more likely to be first used by the user are downloaded before files that are less likely to be first used, and wherein files that are less likely to be used first can be downloaded via a background download process.

15. The method of claim 14, wherein the software extension is to be incorporated into a software platform executing on the client.

16. The method of claim 14, wherein the downloading of the files takes place by downloading the files in an order that is described in the manifest.

17. The method of claim 14 further comprising validating one or more downloaded files using the manifest.

18. The method of claim 14 further comprising updating one or more files using the manifest.

19. One or more computer-readable media comprising computer-readable instructions thereon which, when executed by a computer, cause the computer to implement the method of claim 14.

20. A computer programmed with instructions which, when executed by the computer, implement the method of claim 14.

21. A method of providing software via a network comprising:

describing one or more software extensions using one or more extensible markup language (XML) files, the extensions being configured for incorporation in a software program executing on a client, individual XML files providing individual manifests that contain a list of files that comprise an extension; and storing the XML files in a Web-accessible location;

wherein at least some of the extensions are downloadable by streaming extension files to the client in a manner that enables a user to begin to interact with the extension sooner than if the user had to wait for the entire extension to load, said manner being developed based on scenario runs in which files that are more likely to be first used by the user are downloaded before files that are less likely to be first used, and wherein files that are less likely to be used first can be downloaded via a background download process.

22. The method of claim 21 further comprising storing extension files associated with the XML files in a Web-accessible location.

23. The method of claim 21 further comprising:

storing extension files associated with the XML files in a Web-accessible location; and providing one or more XML files and one or more associated extension files to a client via the network.

24. The method of claim 21, wherein individual manifests can contain one or more file bashes that can be used for file security.

25. The method of claim 21, wherein individual manifests can contain one or more file hashes that can be used for versioning.

26. The method of claim 21, wherein individual manifests comprise one or more file groups that determine when particular files are downloaded to the client.

27. The method of claim 26, wherein the file groups determine where files are stored on the client.

28. The method of claim 26, wherein the file groups determine how files are packaged.

29. The method of claim 26, wherein the file groups determine where files are stored on the client and how files are packaged.

30. One or more computer-readable media having computer-readable instructions thereon which, when executed by a computer, cause the computer to implement the method of claim 21.

31. An automated software tool comprising a package manifest creation tool configured to:

receive one or more input parameters pertaining to a package manifest that is to describe a software extension that is configured to extend a software application executing on a client; and generate a package manifest that describes the extension, the package manifest being generated using a hierarchical language;

wherein the extension is downloadable by streaming extension files to the client in a manner that enables a user to begin to interact with the extension sooner than if the user had to wait for the entire extension to load, said manner being developed based on scenario runs in which files that are more likely to be first used by the user are downloaded before files that are less likely to be first used, and wherein files that are less likely to be used first can be downloaded via a background download process.

32. The automated software tool of claim 31, wherein the hierarchical language comprises a tag-based language.

33. The automated software tool of claim 31, wherein the hierarchical language comprises extensible markup language (XML).

34. The automated software tool of claim 31, wherein one input parameter specifies a directory containing files that are to be described in the package manifest.

35. The automated software tool of claim 31, wherein one input parameter comprises file group information and load dependencies.

36. The automated software tool of claim 31, wherein one input parameter comprises file usage statistics.

37. The automated software tool of claim 36, wherein the file usage statistics are ascertained from scenario runs.

38. The automated software tool of claim 37, wherein individual scenarios have individual priorities.

39. The automated software tool of claim 36, wherein the file usage statistics are ascertained from scenario runs that are collected by running logs on various scenarios.

40. The automated software tool of claim 36, wherein the file usage statistics are ascertained from scenario runs that are collected by running logs on various scenarios, the scenarios having individual checkpoints that separate one scenario from another.

41. The automated software tool of claim 36, wherein the file usage statistics are ascertained dynamically by building a knowledge base that describes tasks that users typically accomplish.

* * * * *